(12) United States Patent
Huang et al.

(10) Patent No.: US 11,021,408 B2
(45) Date of Patent: *Jun. 1, 2021

(54) NANOPARTICLE FERTILIZER

(71) Applicant: The University of Queensland, St. Lucia (AU)

(72) Inventors: Longbin Huang, Brisbane (AU); Anh Van Nguyen, Brookfield (AU); Victor Rudolph, Brisbane (AU); Gordon Xu, St. Lucia (AU)

(73) Assignee: The University of Queensland, St. Lucia (AU)

( * ) Notice: Subject to any disclaimer, the term of this patent is extended or adjusted under 35 U.S.C. 154(b) by 90 days.

This patent is subject to a terminal disclaimer.

(21) Appl. No.: 16/162,152

(22) Filed: Oct. 16, 2018

(65) Prior Publication Data

US 2019/0047917 A1    Feb. 14, 2019

Related U.S. Application Data

(63) Continuation-in-part of application No. 14/383,093, filed as application No. PCT/AU2012/000227 on Mar. 5, 2012, now Pat. No. 10,118,866.

(30) Foreign Application Priority Data

Mar. 3, 2011    (AU) ................................ 2011900756

(51) Int. Cl.
*C05F 11/00* (2006.01)
*C05C 5/00* (2006.01)
(Continued)

(52) U.S. Cl.
CPC .............. *C05C 5/005* (2013.01); *C05F 11/00* (2013.01); *C05G 5/12* (2020.02); *C05G 5/30* (2020.02); *B82Y 30/00* (2013.01)

(58) Field of Classification Search
CPC .. C05C 5/005; C05G 5/12; C05G 5/30; C05F 11/00; B82Y 30/00
See application file for complete search history.

(56) References Cited

U.S. PATENT DOCUMENTS 10,118,866 B2 * 11/2018 Huang ..................... C05C 5/00
2005/0119154 A1    6/2005 Song et al.
(Continued)

FOREIGN PATENT DOCUMENTS

CN    107619339 A  *  1/2018  ............... A01C 1/06
DE    102007020242 A1    10/2008
(Continued)

OTHER PUBLICATIONS

Yu et al. "Effects of physicocohemical properties of zinc oxide nanoparticles on cellular uptake." Journal of Physical: Conference Series 304. Jan. 2007 (2011): 1-6.
(Continued)

*Primary Examiner* — Jennifer A Smith
(74) *Attorney, Agent, or Firm* — TraskBritt

(57) ABSTRACT

A nanoparticulate fertilizer is provided. The fertilizer may comprise water soluble nanoparticles having a contact area to total surface area ratio greater than 1:4. The nanoparticles may have an overall positive surface charge in water. The fertilizer may be suitable for application as a seed coat. Also provided is a method of applying a seed coat, and a method of fertilizing a plant.

20 Claims, 15 Drawing Sheets

(51) Int. Cl.
*C05G 5/12* (2020.01)
*C05G 5/30* (2020.01)
*B82Y 30/00* (2011.01)

(56) References Cited

U.S. PATENT DOCUMENTS

| | | |
|---|---|---|
| 2006/0014645 A1 | 1/2006 | Yavitz |
| 2007/0009809 A1 | 1/2007 | Krekeler et al. |
| 2010/0160161 A1 | 6/2010 | Choi |
| 2011/0229421 A1 | 9/2011 | Rusin et al. |
| 2015/0266786 A1* | 9/2015 | Huang .................. C05D 9/02 71/58 |

FOREIGN PATENT DOCUMENTS

| | | |
|---|---|---|
| GB | 2396556 A | 6/2004 |
| WO | 03/59070 A1 | 7/2003 |
| WO | 2009/127256 A1 | 10/2009 |
| WO | 2013/118131 A1 | 8/2013 |
| WO | 2013/121244 A1 | 8/2013 |

OTHER PUBLICATIONS

Written Opinion for International application No. PCT/AU2012/000227 filed May 3, 2012, 5 pages.
Rizwan Wahab, Young-Soon Kim and Hyung-Shik Shin. "Synthesis, Characterization and Effect of pH Variation on Zinc Oxide Nanostructures" Materials Transactions, vol. 50, No. 8 (2009) pp. 2092 to 2097.
International Search Report for International application No. PCT/AU2012/000227 dated May 3, 2012, 3 pages.
European Office Action for European Application No. 12752681.2, dated May 9, 2017, four pages.
European Extend Search Report for European Application No. 12752681, dated Jan. 29, 2016, 8 pages.
Chinese Third Office Action for Chinese Application No. 201280072379.6 dated Mar. 20, 2017, 7 pages with translation.
Chinese Second Office Action for Chinese Application No. 201280072379.6 dated Sep. 8, 2016, 13 pages with translation.
Chinese Fourth Office Action for Chinese Application No. 201280072379.6 dated Sep. 13, 2017, 13 pages with translation.
Chinese First Office Action for Chinese Application No. 201280072379.6 dated Oct. 19, 2015, 13 pages with translation.
Bisht, Savita, et al. "pDNA loaded calcium phosphate nanoparticles: highly efficient non-viral vector for gene delivery." International journal of pharmaceutics 288.1 (2005): 157-168.

* cited by examiner (A)

(B)

(A)

(B)

(A)

(B)

(A)

(B)

NANOPARTICLE FERTILIZER

CROSS-REFERENCE TO RELATED APPLICATIONS

This application is a continuation-in-part of U.S. patent application Ser. No. 14/383,093, filed May 14, 2015, now U.S. Pat. No. 10,118,866 issued Nov. 6, 2018, which is a national phase entry under 35 U.S.C. § 371 of International Patent Application PCT/AU2012/000227, filed Mar. 5, 2012, designating the United States of America and published in English as International Patent Publication WO 2012/116417 A1 on Sep. 7, 2012, the disclosure of each of which is hereby incorporated herein in its entirety by this reference.

TECHNICAL FIELD

The present invention relates to a plant fertilizer. Particularly, the present invention relates to a fertilizer having improved morphology and physicochemical characteristics, that may be suitable for application as a seed coat and/or foliar fertilizer.

BACKGROUND

Plants require a range of nutrients, both macro- and micro-, to ensure healthy growth. In certain environments, abiotic constraints preclude the availability of sufficient amounts of these essential nutrients for root uptake via addition of fertilizer to the soil. This can be due to inadequate levels of soluble forms of mineral nutrients in soil solution, water deficit in the top soil, an alkaline soil pH, high soil carbonate content, low organic matter content in soil and other key soil factors that limit nutrient availability.

Grain and seed crops as well as fruit trees require rapid and intensive nutrient supply of large amounts of mineral nutrients into flowers, young seeds, pods and fruits, particularly during the reproductive growth stage, which may coincide with declined root vigor and unfavorable soil (e.g., water deficit) and climate conditions (e.g., high temperature), leading to untimely and inadequate nutrient supply to meet this rapid demand. In addition, continual removal of micronutrients in seeds, grains and fruits can deplete the available pool of nutrients in soils. Under these circumstances, the application of foliar fertilizers provides a precise, timely and effective supply of nutrients for plant reproductive organs and at much lower required application rates than soil fertilizers. This can result in not only quick correction or prevention of nutrient disorders and yield losses but also an improvement in crop quality.

Under such conditions it has been found that foliar fertilization provides great benefits in terms of producing improved yields of healthy plants and crops. Foliar fertilization is the application of liquid fertilizer directly onto aboveground plant parts, rather than to the soil surrounding the plant. The fertilizer is drawn into the plant by penetration through either or both of the stomatal openings and cuticle, into the leaf epidermis.

A typical foliar fertilizer may be either a solution of a soluble chemical compound in water or a dispersion/suspension of a non-soluble fertilizing compound in water.

The use of a soluble fertilizing compound facilitates rapid penetration of nutrient ions into the plant and therefore provides for efficient correction of nutritional deficiencies. However, the use of a highly soluble fertilizing compound can lead to phytotoxicity and so it can only be applied in very low concentrations through repetitive sprays (for example, 2-4 sprays from late vegetative growth to reproduction stage). This necessitates the labor intensive use of a low dosage fertilizer composition over multiple applications to supply the required amount of nutrients for healthy growth.

Suspension foliar fertilizers are, generally, inorganic mineral compounds, such as oxides and hydroxides, which are finely ground and have relatively low water solubility. Due to their low solubility they can be applied to plants at higher concentrations without any risk of phytotoxicity. The presence of the low solubility fertilizing compound on the leaf surface acts as a slow release source meaning the plant can be supplied with appropriate nutrients over a relatively long period of time after a one time application process.

In practice it has been found that the advantages of suspension foliar fertilizers are tempered by issues of poor distribution on the leaf surface as well as availability of the low solubility fertilizing compound sometimes being inadequate. Further, since the fertilizing compound, after application, is left behind as a fine solid on the leaf surface it may be prone to being washed or blown off that surface by the elements.

Seed coating with fertilizer can also potentially allow for the provision of nutrients, to assist with satisfying crop demand. Seed coating may be particularly effective to help ensure that an adequate supply of nutrients is available during germination and early plant development, which, as for the reproductive phase, can be a phase of growth associated with high nutrient demand.

Although seed coating has substantial potential for effective fertilizer application to plants, such as crop plants, significant variability in the effect of seed coating on plant growth and development has been observed. The morphology and physicochemical properties of fertilizer used for the coating process are factors that may make a significant contributing to the effectiveness of seed coat approaches to fertilizer application.

In view of the above, new plant fertilizers facilitating efficient and reliable supply of desired nutrients to a plant would be useful. New fertilizers suitable for use for foliar and/or seed coat application would be particularly desirable.

BRIEF SUMMARY

In a first broad form, the invention resides in a nanoparticulate fertilizing compound.

Preferably, nanoparticles of the fertilizing compound have a contact surface area to total surface area ratio greater than 1:4.

Preferably, the nanoparticles are at least partially water soluble.

Preferably, the nanoparticles have an overall positive surface charge or potential in water. The surface charge or potential may be measured by microelectrophoresis.

In a first aspect, the invention resides in a nanoparticulate fertilizer comprising at least partially water soluble nanoparticles having a contact area to total surface area ratio greater than 1:4.

Preferably, the nanoparticles have an overall positive surface charge in water.

In one preferred embodiment, the nanoparticulate fertilizer is for application as a seed coat.

In one preferred embodiment, the nanoparticulate fertilizer composition is for application as a foliar fertilizer.

Preferably, the contact surface area to total surface area ratio of the nanoparticles is greater than 1:3, more preferably approaching 1:2.

Preferably, the ratio of the contact surface area to the volume of the nanoparticles may be defined as being at least 1, preferably more than 10, more preferably more than 20, more preferably more than 50, most preferably more than 100.

Suitably, the nanoparticles have a planar, sheet-like, or platelet morphology.

In some preferred embodiments, the fertilizing nanoparticles comprise one or more of a nitrate group; an oxalate group; and a hydroxide group. In a preferred embodiment, the fertilizing nanoparticles comprise a nitrate group. In a preferred embodiment, the fertilizing nanoparticles comprise an oxalate group. In a preferred embodiment, the fertilizing nanoparticles comprise a nitrate group and a hydroxide group.

Suitably, the nanoparticles have at least one dimension less than about 1000 nm, preferably less than about 500 nm, more preferably less than about 250 nm, even more preferably less than about 150 nm. In a preferred embodiment the nanoparticles have at least one dimension less than about 100 nm.

Preferably, the nanoparticles are nanocrystals.

Preferably, the solubility of the fertilizing nanoparticles in water is between about 0.1-1000 mg/L. Preferably, the solubility of the nanoparticles is 0.1-100 mg/L for micronutrient elements. Preferably, the solubility of the nanoparticles is 100-1000 mg/L for macronutrient elements. Suitable ranges can include: for zinc and manganese, 5-50 mg/L; for copper, 1-5 mg/L; for molybdenum, 0.1-1 mg/L; for calcium and magnesium, 100-500 mg/L; for iron, 15-150 mg/L.

The fertilizing nanoparticles may contain a plant nutrient element selected from the group consisting of zinc, copper, iron, manganese, boron, molybdenum, chlorine, phosphorus, potassium, calcium, magnesium and sulphur.

Preferably, the fertilizing nanoparticles have one or more groups that form a water-soluble salt with a cationic fertilizing element including nitrate, hydroxide, oxalate, chloride, sulphate, phosphate and acetate, but not limited thereto.

The fertilizing nanoparticles may be or comprise a zinc containing compound having at least one nitrate group.

The fertilizing nanoparticles may be or comprise a zinc containing compound having at least one hydroxide group.

The fertilizing nanoparticles may be or comprises a zinc containing compound having at least one nitrate group and at least one hydroxide group.

The fertilizing nanoparticles may be or comprise a manganese containing compound having at least one oxalate group.

The fertilizing nanoparticles may be or comprise an iron containing compound having at least one oxalate group.

In a preferred embodiment, the fertilizing nanoparticles are or comprise a zinc hydroxide nitrate compound. Suitably, the fertilizing compound may have the formula $Zn_5(OH)_8(NO3)_2 \cdot 2H_2O$.

In a preferred embodiment, the fertilizing nanoparticles are or comprise a manganese oxalate compound. Suitably, the fertilizing compound may have the formula $Mn(C_2O_4) \cdot 2H_2O$.

In a preferred embodiment, the fertilizing nanoparticles are or comprise an iron oxalate compound. Suitably, the fertilizing compound may have the formula $Fe(C_2O_4) \cdot 2H_2O$.

In a second aspect, the invention resides in a seed coat composition comprising a nanoparticulate fertilizer of the first aspect.

In embodiments of the second aspect, the seed coat composition may further comprise one or more pesticides, insecticides, and/or fungicides.

In a third aspect, the invention resides in a seed coated with a seed coat composition of the second aspect.

In a fourth aspect, the invention resides in a foliar fertilizer formulation comprising a nanoparticulate fertilizer of the first aspect.

Preferably, the foliar fertilizer formulation further comprises a liquid carrier. The liquid carrier may be an aqueous liquid carrier.

In embodiments, the liquid carrier is water, is substantially water or consists of water.

In embodiments, the liquid carrier may contain one or more suitable surfactants and/or stability additives. Preferably, the stability additives include carboxymethyl cellulose and/or propylene glycol.

In a fifth aspect, the invention resides in a stabilized liquid fertilizer formulation comprising a nanoparticulate fertilizing compound of the first broad form, or a nanoparticulate fertilizer of the first aspect, and one or more stability additives. Preferably, the stability additives include carboxymethyl cellulose and/or propylene glycol.

In a sixth aspect, the invention resides in a method of applying a seed coat to a seed, including the steps of:
  (a) providing a fertilizer composition comprising fertilizing nanoparticles; and
  (b) coating the fertilizer composition on the seed.

In a seventh aspect, the invention resides in a method of delivering a nutrient to a plant including the steps:
  (a) providing a fertilizer composition comprising fertilizing nanoparticles;
  (b) coating the fertilizer composition on the seed;
  (c) germinating a plant from the seed.

In an eighth aspect, the invention resides in a method of delivering a nutrient to a plant including the steps of:
  (a) providing a foliar fertilizer composition comprising a nanoparticulate fertilizing compound dispersed in a liquid carrier; and
  (b) applying the foliar fertilizer composition to the plant.

Preferably, the contact surface area to total surface area ratio of the nanoparticles according to the sixth to eighth aspects is greater than 1:4, more preferably approaching 1:2.

Preferably, the nanoparticulates according to the methods of the sixth to eighth aspects are nanocrystals.

Preferably, the nanoparticles according to the methods of the sixth to eighth aspects have a planar or sheet-like morphology Preferably, the nanoparticles according to the methods of the sixth to eighth aspects have an overall positive surface charge or potential in water.

In preferred embodiments, the nanoparticulate fertilizing composition according to the methods of the sixth to eighth aspects comprises a fertilizing compound according to the first broad form or a nanoparticulate fertilizer according to the first aspect.

Further features of the present invention will become apparent from the following detailed description.

Throughout this specification, unless the context requires otherwise, the words "comprise," "comprises" and "comprising" will be understood to imply the inclusion of a stated integer or group of integers but not the exclusion of any other integer or group of integers.

BRIEF DESCRIPTION OF THE DRAWINGS

In order that the invention may be readily understood and put into practical effect, preferred embodiments will now be described by way of example with reference to the accompanying figures wherein.

DETAILED DESCRIPTION

Figure 1A:
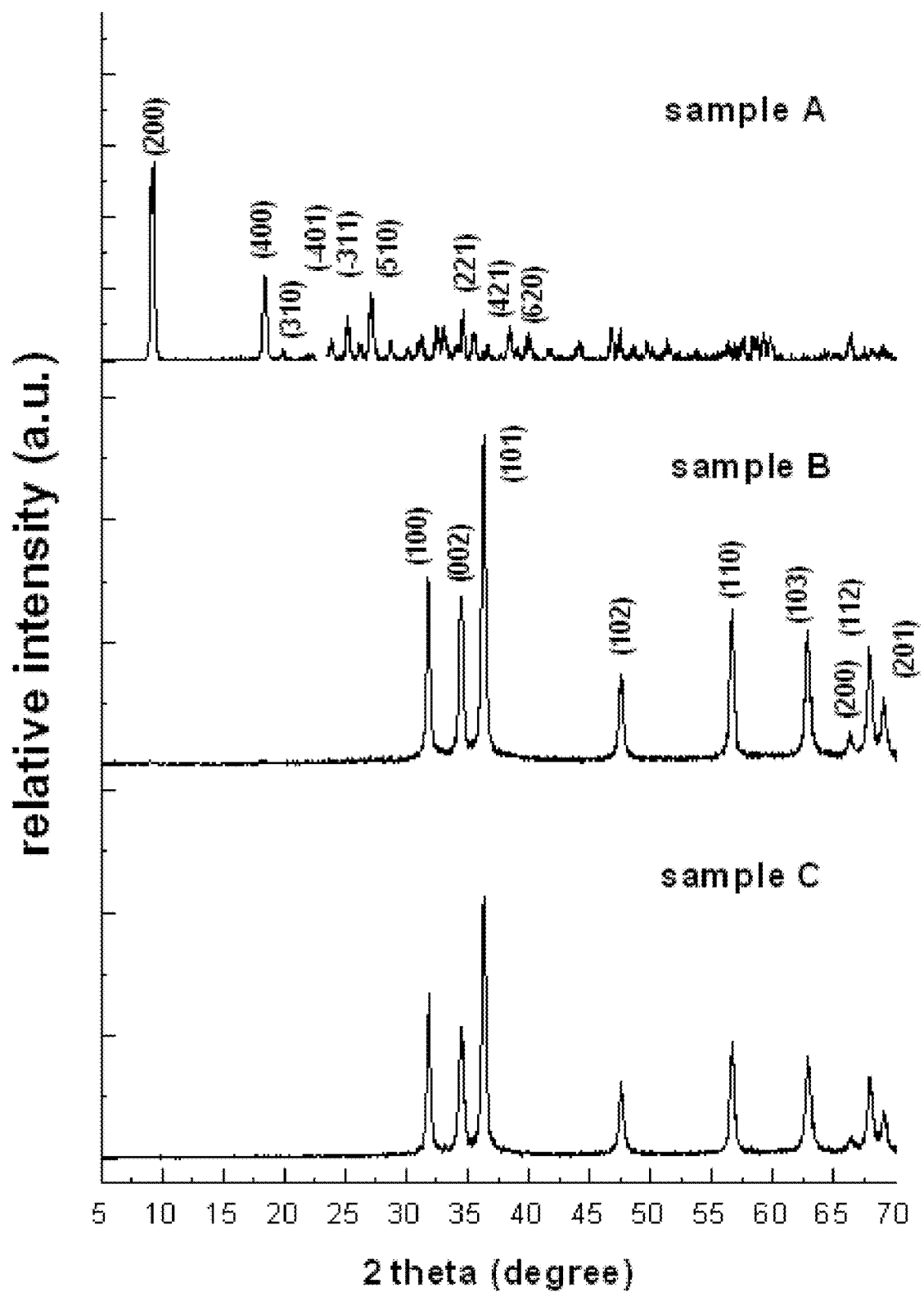
FIG. 1A shows a series of XRD patterns for three zinc containing fertilizing compounds.

As described herein, nanocrystalline compounds containing essential nutrients have been synthesized to have effective physical and chemical characteristics, including a high contact surface area/total surface area ratio for maximal surface contact, suitable chemical composition and charge balance to achieve a net positive charge, and reactive surface edges for cation exchange to release nutrient cationic ions on plant surfaces.

The present invention is predicated, at least in part, on the development of a fertilizing compound that takes the form of nanocrystal platelets or sheets, the nanoparticles typically being water soluble and typically having an overall positive surface charge or potential in water. The characteristics of the nanoparticles are considered particularly beneficial for foliar and seed coat fertilizer applications.

Typically, the fertilizing compound, due to its chemical composition, has a suitable solubility range in water such that it can be delivered to a plant, such as plant leaves when used as a foliar fertilizer, and roots or developing seedlings when used as a seed coat, in sufficient quantities without demonstrating phytotoxicity. Typically, the fertilizing compound forms a slow release system.

In particular regard to seed coat fertilizer applications, nanoparticulate fertilizer as described herein has been observed to offer a surprising increase in plant yield as compared to an established seed coat fertilizer containing similar nutrients. Although not wishing to be bound by any particular theory, it is postulated that physical characteristics of the fertilizer particles, such as the platelet shape, nano-sized dimensions, high overall surface area to volume ratio, and positive surface charge or potential, may be advantageous for encouraging germination of seeds and/or delivery of nutrient elements to plants, including developing seedlings and plant roots. It is further postulated that the characteristics of the fertilizer particles may be advantageous to allow for intercalation of further seed coat additives, including other fertilizer elements, anions, or cations; and/or pesticides, insecticides, and/or fungicides. This may be advantageous for encouraging delivery of any such further seed coat additives to plants.

In particular regard to foliar fertilizer applications, nanoparticulate fertilizer as described herein has been observed to provide surprisingly large gains in terms of the efficiency of delivery of a nutrient element to a plant through its leaf surface. Although not wishing to be bound by any particular theory it is postulated that the platelet shape and nanosized dimensions of the nanocrystal provide for a high overall surface area to volume ratio, meaning the compound is somewhat better placed to dissolve and become bioavailable to the plant, and, particularly, a high contact surface area to total surface area ratio leads to reduced mobility of the compound on the leaf and a much improved solubility/release profile while the overall positive surface charge or potential results in good dispersion over and strong adherence onto the leaf surface thereby reducing post-application loss.

Although the invention will be exemplified herein with particular reference to zinc hydroxide nitrate, iron(II) oxalate, and manganese(II) oxalate fertilizing compounds, it is believed that the principles discussed are equally applicable to a range of nutritional element-containing compounds capable of providing suitable nanoparticulate morphology and an overall positive surface charge or potential.

The term "seed coat," as used herein, refers to a composition suitable for application onto a seed of a plant, which allows for germination and growth of a plant from the seed. Seed coats containing fertilizing compounds, nanoparticles, and compositions as described herein will be adapted to allow delivery of nutrients during germination and/or growth of a plant from the seed.

The term "foliar fertilizer," as used herein, refers to a composition suitable for application onto the leaves of a plant that, upon dissolution, is capable of delivering a desired nutrient to the plant. The foliar fertilizers described typically comprise a partially soluble fertilizing compound suspended or otherwise dispersed or contained within an aqueous solution.

The term "contact surface area," as used herein, relates to the surface area of the fertilizer particle that is in either direct contact with or is immediately adjacent to, the leaf surface. For a variety of shapes this is likely to be the surface with the greatest individual surface area as this will be a more stable "landing" position for the particle to take when it locates on the leaf surface. For example, for the platelets or sheet-like nanoparticles described herein the contact surface area is one of the two large surfaces as opposed to a "side" or "edge" of the platelet or sheet.

The terms "dispersed" or "dispersion," as used herein, refers to the presence of a fertilizing compound within an aqueous solution forming a foliar fertilizer composition. The fertilizing compound will have limited solubility in the aqueous solution such that solid particles thereof will be suspended or able to be suspended therein.

Metals and metalloids are often used in plant fertilizers, including foliar and seed coat fertilizers. The present inventors postulated that optimization of the morphology and charge characteristics of a metal or metalloid containing fertilizing compound could result in improved efficacy for use as a foliar fertilizer and/or seed coat.

Initially, three samples of a zinc-containing fertilizing compound were synthesized and characterized as set out in the examples section. Sample A was shown to be zinc hydroxide nitrate ($Zn_5(OH)_8(NO3)_2$), which typically exists in the dihydrate form as $Zn_5(OH)_8(NO3)_2 \cdot 2H_2O$. Samples B and C were both zinc oxide but the different synthetic conditions employed in their production resulted in nanoparticles with different morphology characteristics.

Zinc hydroxide nitrate, Sample A, was synthesized by a variation on a known synthetic method, as described in the examples section. Samples B and C were synthesized in a relatively similar manner but with key variations as set out in the example section. The particular process conditions used produced zinc-containing fertilizing compounds with corresponding morphologies as discussed below.

Figure 2:
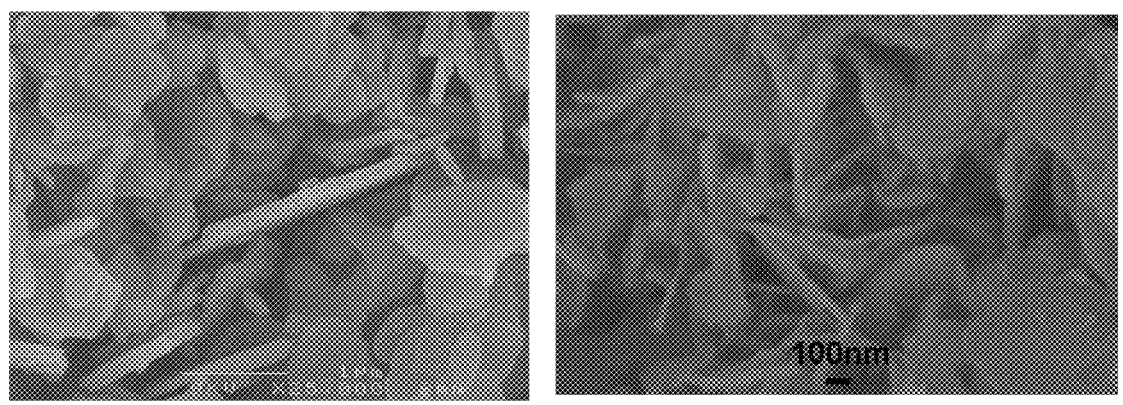
FIG. 2 shows two scanning electron micrograph images of sample A (zinc hydroxide nitrate) as a fertilizing compound of the present invention.

FIG. 2 shows two scanning electron micrograph (SEM) images of Sample A in which the platelet or sheet-like morphology of the material can be clearly seen. The thickness of the platelets are between about 50-100 nm while the lateral dimension was generally in the range of 0.2-1 The zinc hydroxide nitrate synthesized can thus accurately be described as having formed a nanomaterial or being nanoparticulate. Particularly, the images shown in FIG. 2 can be said to show nanocrystals.

The platelet shape of the Sample A nanocrystals means that they have a very high plant contact surface area to total surface area ratio. It has been found that this can provide surprisingly large gains in efficacy over larger amorphous particles and even morphologies such as nanocubes, nanorods and the like.

It appears, without being limited to any particular theory, that using morphology such as exemplified by Sample A, a greater proportion of the fertilizer is exposed to the environment, which will solubilize the material and allow it to enter the plant more efficiently. Furthermore, in at least some circumstances, more of the material may be in physical contact with the plant surface due to the platelet morphology. This may result in the metallic fertilizer being made available to the plant in a more efficient manner, and also, in at least some circumstances, means the nanoparticles are less likely to be mobile on a plant surface (such as a plant leaf or developing seedling) and therefore inadvertently displaced, as can happen with shapes having a lower contact surface area to total surface area ratio and greater resulting mobility, such as spherical particles.

In general terms, the smaller the size of a crystal with a particular shape the larger the specific surface area (or surface area to volume ratio) and thus the greater the likelihood of a larger relative contact area between crystal and plant or plant part, such as plant leaf, plant roots, or developing seedling.

Figure 5:
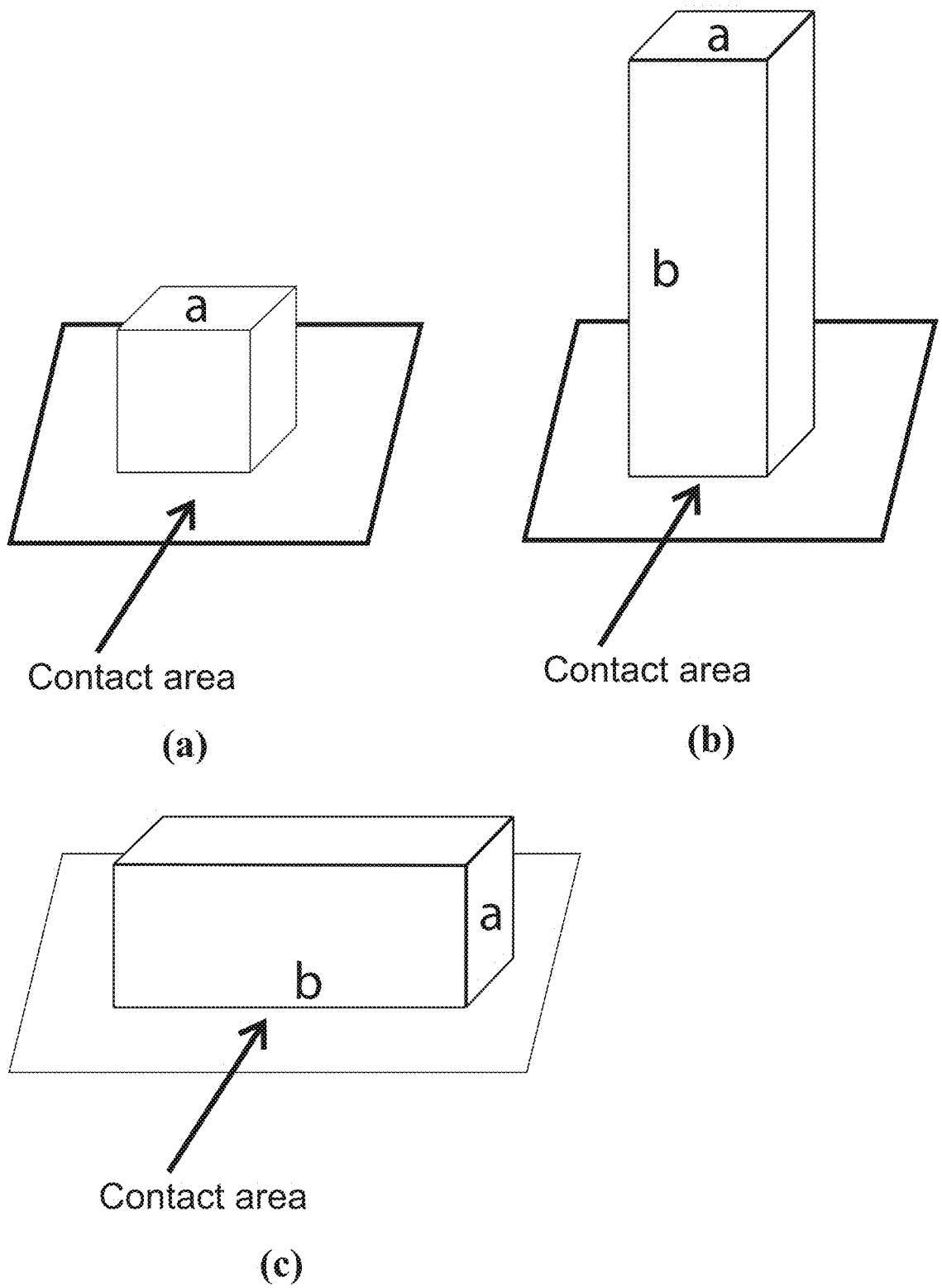
FIG. 5 is a series of diagrammatic representations of the contact area of different morphologies of fertilizing compounds.

In relation to the nanocrystals provided by the present invention this can be further considered by the ratio of the contact surface area (i.e., the area of crystal in contact with or immediately adjacent the leaf surface) to the total surface area of the crystal. By way of example, for a sphere the theoretical contact area approaches zero, as it is a point contact, and so the ratio is close to zero. For a cube the ratio is 1/6, for a very long square prism the ratio is close to 1/4 and for a very thin sheet, the ratio is close to 1/2. Thus for a nanocrystal of sheet-like or platelet morphology, as seen for Sample A, more surface area is effectively available as the leaf contact area. This is shown in FIG. 5.

Figure 3:
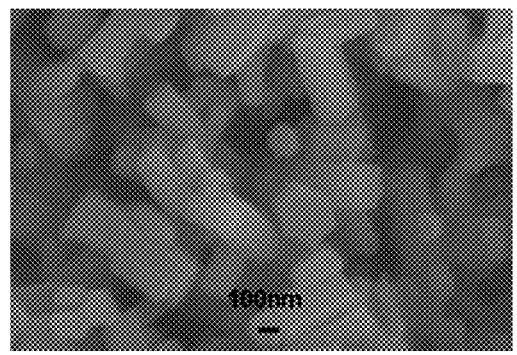
FIG. 3 is a scanning electron micrograph image of sample B (zinc oxide)

FIG. 3 shows that Sample B produced a typical zinc oxide crystal shape, nanorods, with a hexagonal cross section. The side length of the hexagonal cross section was about 100 nm while the length of the rods was in the range of 200-400 nm.

Figure 4:
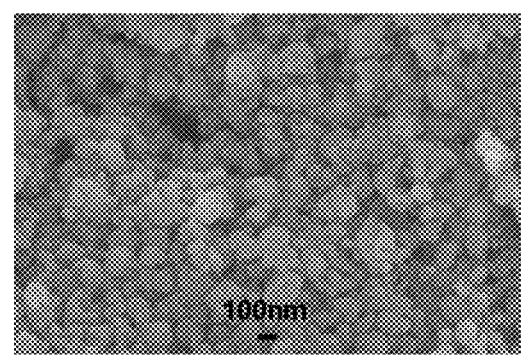
FIG. 4 is a scanning electron micrograph (SEM) image of sample C (zinc oxide)

FIG. 4 is a SEM of the particles of Sample C and it can be seen that the crystal size was approximately 50-100 nm, on average, without noticeable morphological features. These crystals are aggregated into particulates of a hundred to a few hundred nanometers in size.

The uptake of each of Samples A, B and C along with a commercial zinc-containing foliar fertilizer (Activist 30% Zn in which the zinc is present as zinc oxide) was tested on

*capsicum* plant leaves, as set out in the examples section. The results of these tests are summarized in Table 1 wherein the parameter LSD 0.05 refers to Fisher's least significant difference analysis with 5% limitation.

The results show that the Sample A is significantly more effective at delivering zinc into the plant leaf than either of Sample B or C or the commercially available treatment. In terms of the percentage of the applied zinc dosage to reach the interior of the leaf, Sample A was more efficacious than the commercial treatment in making bioavailable almost three times as much zinc for a similar total applied amount.

Samples B and C produced relatively similar results to each other and both were improved over the commercial treatment, although by an amount just under the determined limit of statistical significance. The better delivery of zinc into the leaf, as observed for Samples B and C by comparison to the commercial treatment, is believed to be due purely to the smaller, nanoscale size of their particles. The Activist 30% Zn contains zinc oxide, just as Samples B and C do, but the smaller particle sizes of B and C result in a higher overall bulk solubility and so more of the zinc is available to the leaf.

Use of Sample A for seed coat application of fertilizer was also assessed as set out in the examples section. Specifically, the yield of eight corn hybrids at forty locations was assessed in response to: seed coating with insecticide and fungicide but no zinc fertilizer; seed coating using an existing commercial zinc fertilizer containing composition; and seed coating using Sample A particles. As set out in FIG. 21, on average seed coating using Sample A particles resulted in a greater increase in yield than seed coating using the existing commercial zinc fertilizer composition.

The success of Sample A as a fertilizing compound may be attributed to a number of features resulting from its particle morphology and/or physicochemical characteristics. These features include, but are not limited to, the platelet/sheet-like shape of the nanocrystals providing for a high surface area to volume ratio, high contact area to total surface area ratio; the nanoscale dimensions of the platelet improving solubility of the material; the surface charge profile or zeta potential of the zinc hydroxide nitrate; and, the chemical composition of the zinc hydroxide nitrate itself assisting in providing an optimal solubility profile.

Additionally, it may be that Sample A has particular benefits in relation to intercalation with other composition or formulation components, such as other fertilizer elements and/or pesticides, when used as a foliar fertilizer and/or seed coat.

In embodiments of the invention the fertilizing nanoparticles have at least one dimension less than about 1000 nm, preferably less than about 500 nm, more preferably less than about 250 nm, even more preferably less than about 150 nm, or less than about 100 nm. These nanoscale dimensions can allow the fertilizing compound, within a foliar fertilizer composition, to be dispersed evenly, in appropriate amounts, such as across a leaf surface, when applied as a foliar fertilizer, across a seed surface when applied as a seed coat, and/or across a developing seedling or plant surface (e.g., roots and/or cotyledons, although without limitation thereto) upon germination from a coated seed.

Although the platelet morphology described herein is considered optimal it will be appreciated that other nanoparticulate shapes may be suitable so long as they provide a sufficiently large contact surface area to total surface area ratio attain a reasonable rate of solubilization and, therefore, release of the bound zinc. Preferably, the contact surface area to total surface area ratio of the nanoparticulate shapes will be greater than 1:6, more preferably greater than 1:4, even more preferably greater than 1:3 and still more preferably approaching 1:2.

As discussed, it is preferred that the fertilizing compound exists in a form that has a high contact surface area to total surface area ratio to ensure good contact over a maximal area of a plant surface and to increase the amount of compound exposed to solubilizing conditions. As an alternative to the ratio above this may be described as being a contact surface area to volume ratio of the fertilizing compound particles of at least 1/μm, preferably at least 10/μm, more preferably at least 20/μm, even more preferably at least 50/μm and most preferably at least 100/μm. This ratio can be calculated as shown below for certain crystal shapes relating to those shown in FIG. 5, Panels (a)-(c).

FIG. 5, Panel (a), Cube: Contact surface area (Sc)=$a^2$

Volume (V)=$a^3$ therefore,

Contact surface area to volume ratio: R (Sc/V)=1/a

If a=0.01 μm (10 nm), then R (Sc/V)=100/μm

If a=0.1 μm (100 nm), then R (Sc/V)=10/μm

If a=1 μm (1000 nm), then R (Sc/V)=1/μm

If a=10 μm, then R (Sc/V)=0.1/μm

FIG. 5, Panel (b), Square prism (standing):

Contact surface area (Sc)=$a^2$

Volume (V)=$a^2b$ therefore,

Contact surface area to volume ratio: R (Sc/V)=1/b, depending on b (height or thickness)

Suppose a=1 μm (1000 nm),

If b=0.01 μm (10 nm), then R (Sc/V)=100/μm (sheet)

If b=0.1 μm (100 nm), then R (Sc/V)=10/μm (plate)

If b=1 μm (1000 nm), then R (Sc/V)=1/μm

If b=10 μm, then R (Sc/V)=0.1/μm (rod)

Note that a cylinder would give approximately the same result.

FIG. 5, Panel (c), Square prism (laying down):

Contact surface area (Sc)=ab

Volume (V)=$a^2b$ therefore,

Contact surface area to volume ratio: R (Sc/V)=1/a (depending on a scale)

Suppose b=1 μm (1000 nm),

If a=0.01 μm (10 nm), then R (Sc/V)=100/μm (rod)

If a=0.1 μm (100 nm), then R (Sc/V)=10/μm (rod)

If a=1 μm (1000 nm), then R (Sc/V)=1/μm

If a=10 μm, then R (Sc/V)=0.1/μm (plate standing)

The contact area to volume and/or total surface area ratio of a nanoparticle with platelet or sheet-like morphology is thus much higher than other common morphologies used for fertilizer particles, including particles for foliar fertilizer and seed coat application.

With the above in mind, as set out in the examples, processes for larger-scale production of nanoparticulate fertilizer compounds with morphology similar to Sample A were developed.

FIG. 6 to FIG. 9 show characteristics of zinc hydroxide nitrate nanoparticles (of the same chemical formula as Sample A) produced using an industrial scale process developed for the invention. These particles are referred to herein as Sample D particles.

FIG. 10 to FIG. 12 show characteristics of iron oxalate nanoparticles produced using an industrial scale process developed for the invention. These particles are referred to herein as Sample E particles.

Figure 13:
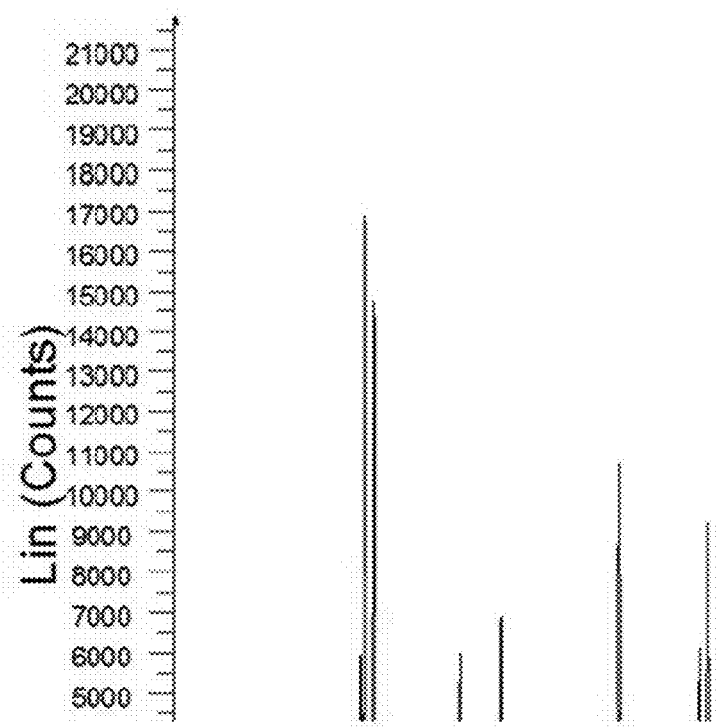
FIG. 13 shows XRD patterns of manganese(II) oxalate nanoparticles produced using an industrial scale procedure after milling and washing.
Figure 14:
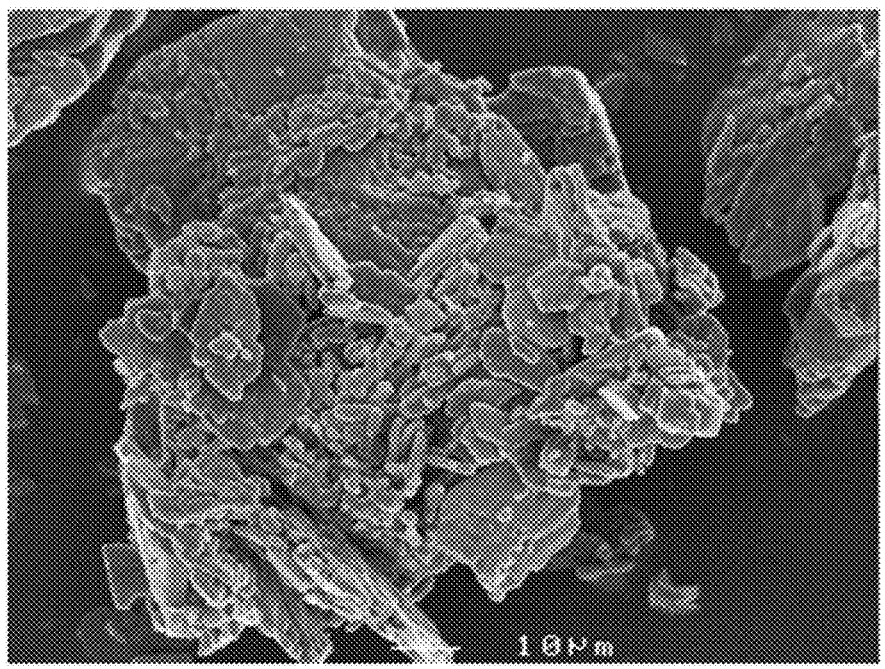
FIG. 14 shows SEM images of manganese(II) oxalate nanoparticles produced using an industrial scale procedure (Panel (A)) after washing but before milling and (Panel (B)) after washing and milling.
Figure 14:
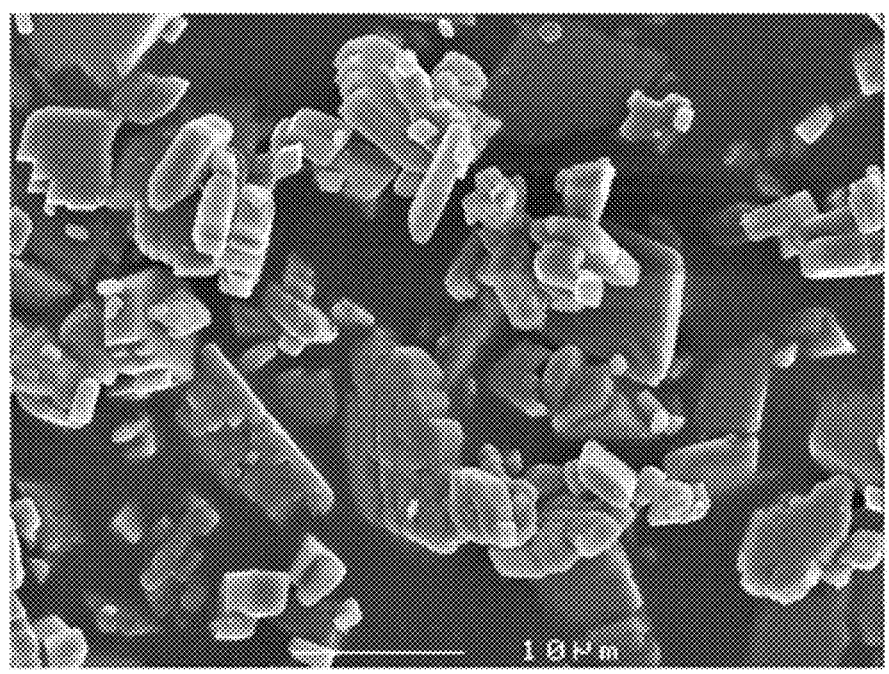
Figure 15:
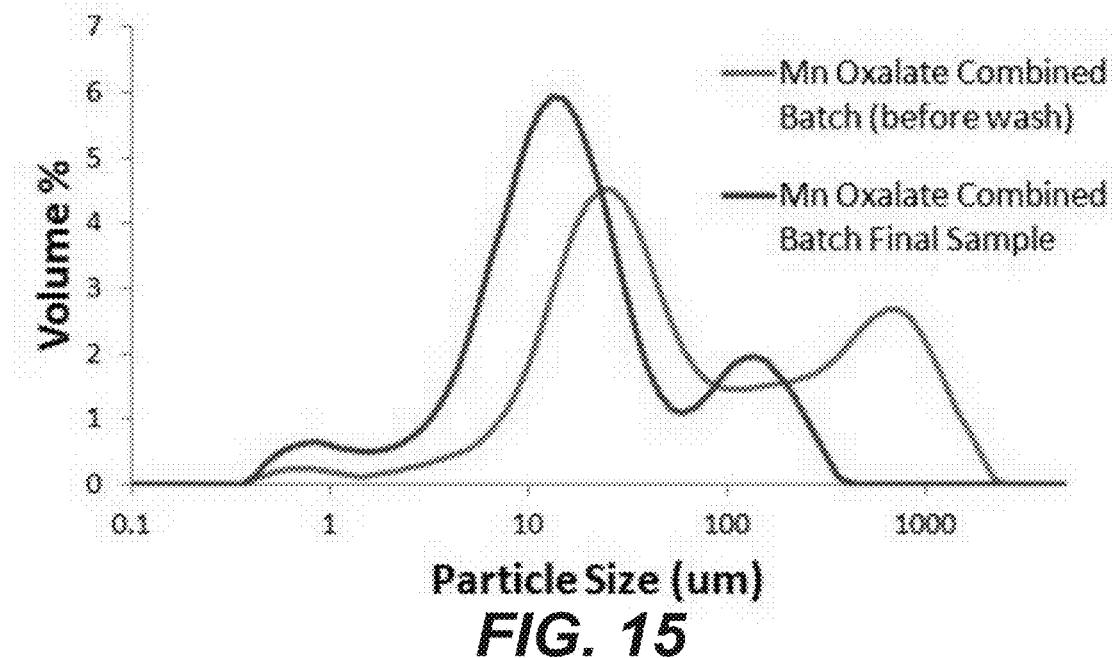
FIG. 15 shows particle size distribution of manganese(II) oxalate nanoparticles produced using an industrial scale procedure before milling and washing (blue line); and after milling and washing (red line).

FIG. 13 to FIG. 15 shows characteristics of manganese oxalate nanoparticles produced using an industrial scale process for the invention. These particles are referred to herein as Sample F particles.

The Sample D, Sample E, and Sample F particles produced have morphology and size characteristics similar to the Sample A particles, described herein.

The skilled person will appreciate that the surface charge of many plant surface such as leaves, cotyledons, and roots is predominantly negative. Many fertilizers, including prior art foliar suspension fertilizers and seed coat fertilizers, employ metal oxides having a negative charge at neutral pH, which may not provide for optimal dispersion onto and contact with a plant surface, such as the leaves and/or roots. For example, zinc oxide nanoparticulate fertilizing compounds display a negative surface charge in water at neutral pH.

Prior art compositions may also use surfactants that can interfere with the surface charge matching between fertilizing compound and leaf surface. Preferably, if present, non-ionic or cationic surfactants are employed in the current formulations to maintain or enhance the positive charge of the suspension for improved adhesion with negatively charged plant surfaces.

The Sample A, Sample D, Sample E, and Sample F particles as described herein have a positive surface charge or potential in water, which can provide distinct advantages in terms of improving the dispersion of the compound evenly over a plant surface as well as the contact between compound and the plant surface. The overall positive surface charge or potential means the nanocrystalline fertilizer particles are attracted to negative plant surfaces and, and may be held in place so that they are less likely to be washed off or otherwise displaced after application. It will be understood that the positive surface charge is the charge presented on the platelet flat outer face and, while the edges of the platelets may display some negative charge, due to the size of this face the overall surface charge is overwhelmingly positive.

The solubility of the fertilizing compound in water is also a feature of at least certain embodiments of the present invention. As already discussed, this is influenced to some extent by the nanoscale size of the particles as well as the high surface area (and contact area) to volume/total surface area ratios achieved. However, the chemical composition of the fertilizing compound is also typically key. Preferably, the fertilizing compound has one or more nitrate, oxalate, chloride, sulphate, phosphate, acetate or like water-soluble salt forming groups that aid in improving the solubility of the compound in comparison to a compound such as zinc oxide or zinc hydroxide.

Preferably, the solubility of the fertilizing compound in water is between 0.1-150 mg/L for micronutrient elements (such as iron, boron, manganese, zinc, molybdenum, and nickel) and 100-1000 mg/L for macronutrient elements (such as calcium, potassium, and magnesium). For zinc and manganese a suitable range is 5-50 mg/L; for copper, 1-5 mg/L; for molybdenum, 0.1-1 mg/L; for calcium and magnesium, 100-500 mg/L; for iron, 15-150 mg/L.

It will be appreciated that nanocrystals as described herein are typically designed to slowly dissolve to release nutrient cations. In embodiments wherein the nanoparticulate fertilizer is used as a foliar fertilizer, this can suitable maintain a concentration of between about 1-100 mg/L nutrient ion in the water film on leaf surfaces for penetration into leaf cells.

The fertilizing compound can be applied to a seed as a seed coat. The seed coat may include one or more further components or agents as are known in the art. The further components may be active or inactive. Further components may include additional fertilizer elements, and/or pesticides, insecticides, and/or fungicides. Further components may include one or more excipients, diluents, and/or carriers.

The fertilizing compound can be delivered to the plant in the form of a foliar fertilizer comprising the fertilizing compound dispersed in a liquid carrier. Preferably, the liquid carrier is an aqueous carrier. The liquid carrier may be water-based but containing one or more suitable surfactants or additives for stability or like formulation purposes. A suitable stability additive is carboxymethyl cellulose (CMC) to form a particularly preferred foliar fertilizer composition.

Although the discussion above has focused on the synthesis of zinc, iron, and manganese-containing fertilizing compounds it will be appreciated that the principles of forming a nanoscale compound with high contact surface area to total surface area ratio, suitable solubility and overall positive surface charge or potential can be applied to nano or submicron particles of a range of other elements. In one embodiment, the fertilizing compound may contain a plant nutrient element selected from the group consisting of zinc, copper, iron, manganese, boron, molybdenum, chlorine, phosphorus, potassium, calcium, magnesium and sulphur.

EXAMPLES

Example 1—Preparation of Sample A, Sample B, and Sample C

Three zinc-containing samples were prepared as herein described. Sample A was synthesized by following a modified precipitation method. A 3.75 M solution of $Zn(NO_3)_2$ (75 mmol in 20 ml deionized water) was poured with 0.75 M NaOH (37.5 mmol in 50 mL deionized water), i.e., giving a OH/Zn ratio of 0.5, with mechanical stirring at a rate of 500 rpm at room temperature. The stirring was continued for a period from 10 minutes to 24 hours. The precipitate was then collected by filtration, washed with deionized water and dried at 65° C.

Sample B was synthesized using a similar process as for Sample A but the OH/Zn ratio was changed to 1.6 (8/5). In brief, a 1.88 M solution of $Zn(NO_3)_2$ (18.8 mmol in 10 ml deionized water) was poured with 0.75 M NaOH (30.0 mmol in 40 mL deionized water), i.e., giving a OH/Zn ratio of 1.6, under mechanical stirring at a rate of 500 rpm at 50° C. The stirring was continued for a period of 1 to 24 hours. The precipitate was then collected by filtration, washed with deionized water and dried at 65° C.

Sample C was synthesized via the same process as that of sample B but with the concentration of zinc nitrate reduced. A 0.47 M solution of $Zn(NO_3)_2$ (23.5 mmol in 50 ml deionized water) was poured with 0.75 M NaOH (37.5 mmol in 50 ml deionized water), i.e., giving a OH/Zn ratio of 1.6, under mechanical stirring at a rate of 500 rpm at 50° C. The stirring was continued for a period from 1 to 24 hours. The precipitate was then collected by filtration, washed with deionized water and dried at 65° C.

Example 2—Characterization of Samples A, Sample B, and Sample C

Powder X-ray diffraction (XRD) was performed using a Bruker D8 Advance equipped with a Copper target scintillation detector and graphite monochromator with Cu K$\alpha$ ($\lambda$=1.54 Å) radiation. The 2$\theta$ angle was scanned from 5° to 70° and the scanning rate was 3°/minute. The Fourier transform infrared (FTIR) spectra were collected in the range of 4000-400 cm$^{-1}$ via a Fourier Transform Infrared—Attenuated Total Reflectance technique in a Nicolet 6700 FTIR spectrometer manufactured by Thermo Electron Corporation. SEM images were recorded in a JEOL JSM-6300 to investigate the morphology and particle sizes of the produced samples.

The powder X-ray diffraction pattern of sample A, shown in FIG. 1A uppermost pattern, was identified by comparison with the internationally accepted database of powder diffraction patterns, JCPDS (Joint Committee on Powder Diffraction Standards now administered by the International Centre for Diffraction Data) card 24-1460 as being zinc hydroxide nitrate according to the characteristic diffraction peaks that are marked with the Miller (hkl) indices, as seen in FIG. 1. The observed interlayer spacing for sample A was around 0.97 nm, which is in good agreement with literature reports (Hussein et al., 2009).

Figure 1B:
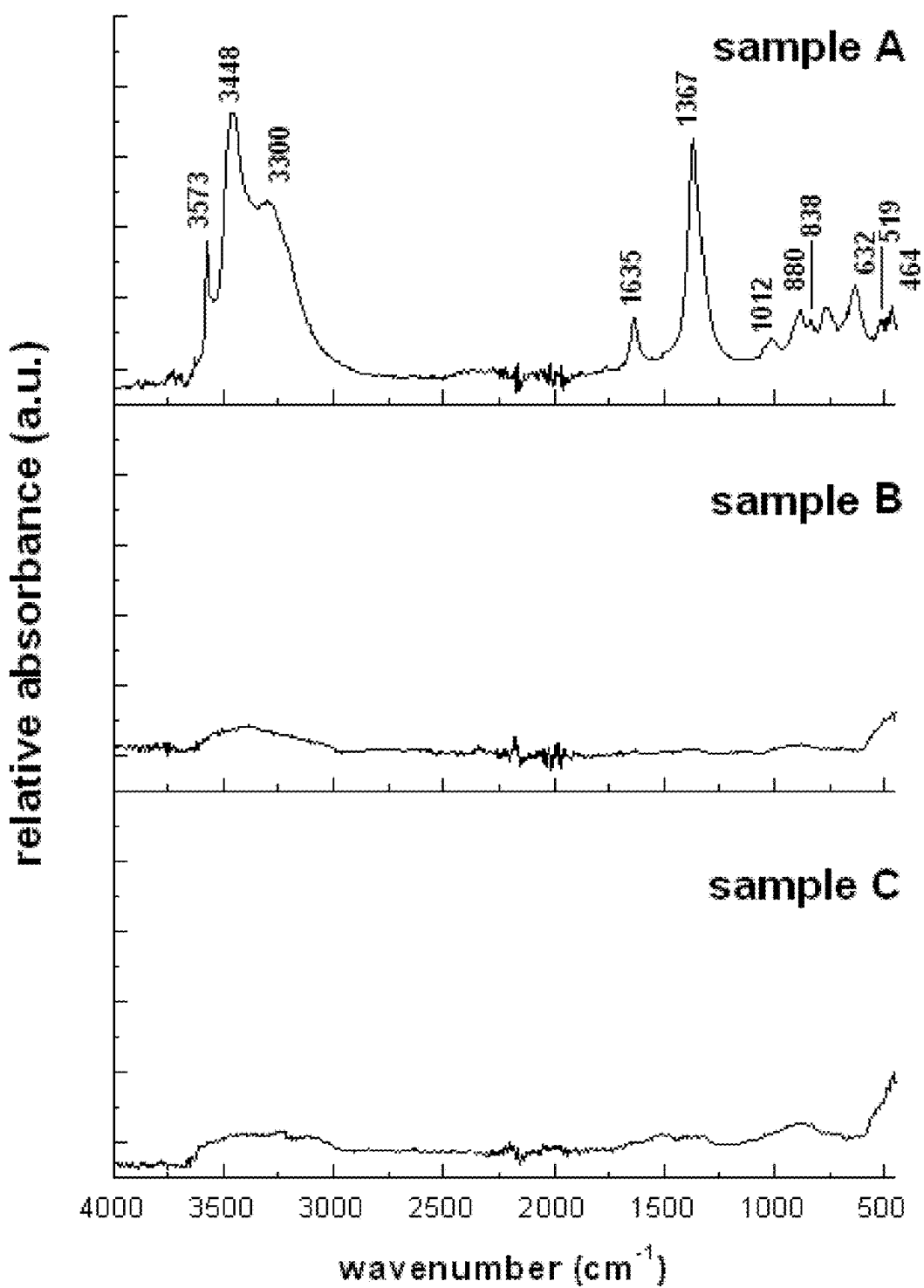
FIG. 1B shows a series of FTIR spectra for three zinc containing fertilizing compounds.

The FTIR spectrum of sample A, as seen in FIG. 1B uppermost spectra, further confirmed the compound as being zinc hydroxide nitrate. The sharp peak seen at 3573 cm$^{-1}$ is attributed to the stretching vibration of the O—H bond associated with the zinc ion and is to be expected as zinc hydroxide nitrate contains a relatively high number of hydroxide groups. The broad band at 3448 cm$^{-1}$, as well as the peak at 1635 cm$^{-1}$, indicated the presence of water molecules in the interlayers and/or adsorbed on the molecule's surface. The shoulder seen at about 3300 cm$^{-1}$ is attributed to O—H groups (from Zn—OH and $H_2O$) hydrogen-bonded with nitrate or water molecules. The intensive peak around 1367 cm$^{-1}$, the weak peaks around 1012 cm$^{-1}$, and the weak peak at 838 cm$^{-1}$ characterize various vibration modes of the nitrate group.

According to the literature, a shoulder around 1430 cm$^{-1}$, relating to nitrate anions grafted to the hydroxide layer, should be observable, however, in this instance the shoulder was not significant probably indicating the nitrate group keeps its $C_{3v}$ symmetry. The band at 632 cm$^{-1}$ and the weak peak at 519 cm$^{-1}$ were due to bending of the Zn—O—H bond and the vibration of the Zn—O bond resulted in a peak at 464 cm$^{-1}$. In this manner the X-ray diffraction patterns and FTIR spectra allowed Sample A to be unequivocally identified as zinc hydroxide nitrate with a molecular formula of $Zn_5(OH)_8(NO_3)_2 \cdot 2H_2O$.

Samples B and C gave a powder X-ray diffraction pattern, shown in FIG. 1A middle and bottom respectively, identical to the JCPDS card 36-1451 indicating the presence of wurtzite-structure zinc oxide. In the FTIR spectra of samples B and C, shown in FIG. 1B middle and bottom respectively, weak and broad bands at around 3372 cm$^{-1}$ were observed that could be attributed to O—H stretching of adsorbed water molecules. Vibration of the Zn—O bonds was observed at around 500 cm$^{-1}$.

Example 3—Foliar Uptake of Sample A, Sample B, and Sample C

*Capsicum* (*Capsicum annume* L.cv. Giant Bell) plants were grown in a glasshouse with the temperature controlled at 25/20° C. (day/night). One week after germination each *capsicum* seedling was transferred into a 3 L pot filled with potting mix. Basal nutrients were supplied to each pot by adding 5 g of Osmocote slow release fertilizer (NPK 16:9:12 plus micronutrient; Scotts Professional) per pot.

Leaves from the 6-week-old plants were then cut at the base of their petioles. Petioles were immersed in Eppendorf tubes filled with a nutrient solution containing all basal nutrients, except zinc. The tubes were inserted in holes at the bottom of Petri dishes. The leaf blades rested on moist filter paper to create approximately 100% relative humidity during the incubation process.

The as prepared leaf surfaces were then exposed to one of four different zinc sources being Samples A, B and C, described above, and a sample for comparison purposes. A commercial product, Activist 30% Zn (Agrichem Co. Ltd.), was applied as the comparison sample and some leaves were not exposed to any zinc-containing sample to thereby act as a control. Samples A, B and C were dispersed in deionized water to make homogeneous suspensions with the aid of ultrasonic treatment and employing the same surfactant as is found in Activist 30% Zn to ensure consistency between samples.

The three synthesized zinc sample suspensions and the Activist 30% Zn were applied on separate adaxial leaf surfaces using a micropipette with droplet volume of approximately 5 µL. The calculated loading amount of fertilizing compound on each leaf surface is displayed in Table 1. After application of the zinc-containing samples the leaves were transferred into an incubator and incubated for three days with the temperature set at 25/20° C. (day/night). The light intensity on each shelf was greater than 170 µmol/m$^2$/s (TRISL model, Thermoline). The leaves were then harvested and all residual zinc compound on the leaf surface washed off by wiping the treated areas using clean moist cotton buds and then rinsing three times with triple deionized water. The leaves were then oven-dried at 68° C. for 48 hours before digestion with concentrated $HNO_3$ and $H_2O_2$ using a microwave digestor (Milestone Inc.). Foliar uptake of zinc was determined by comparison of the difference between the zinc concentration found in treated leaves and untreated leaves. Table 1 shows the results of the uptake study.

Example 4—Assessment of Sample A as a Seed Coat Fertilizer

Field trials were conducted to assess the effect of application of Sample A as a seed coat fertilizer on yield in a crop plant, specifically corn. Eight hybrid corn lines were tested (2123, 2417, 2845, 3146, 4099, 4721, 6265, and 6274). Forty locations were used, with two hybrid lines per location.

The hybrid corn lines assessed were characterized as 80 days Relative Maturity (80 RM), 90 days Relative Maturity (90 RM), 100 days Relative Maturity (100 RM), and 110 days Relative Maturity (110 RM).

The two 80 RM lines 2123 and 2417 were assessed at five locations.

The two 90 RM lines 2845 and 3146 were assessed at 4 locations.

The two 100 RM lines 4099 and 4721 were assessed at 11 locations.

The two 110 RM lines 6265 and 6274 were assessed at 20 locations.

In addition to seed coating including Sample A ("Sample A Coating"), commercial seed coat containing zinc ("Advanced Coating Zinc," see https://www.winfieldunited.com/Product/AdvancedCoating® Zinc/51), and a base seed coating treatment ("Base Coating") were included as controls. All coatings assessed contained insecticides and fungicides, with the coating differing in respect of the zinc particles included. The particles included in Advanced Coating Zinc were zinc oxide at a concentration of 48-50% w/w elemental zinc. The Advanced Coating Zinc zinc oxide particles were produced using the standard commercial process referred to as the "French" or "indirect" process.

Results of the corn hybrid yield trials are set out in FIG. 16-FIG. 21.

Figure 16:
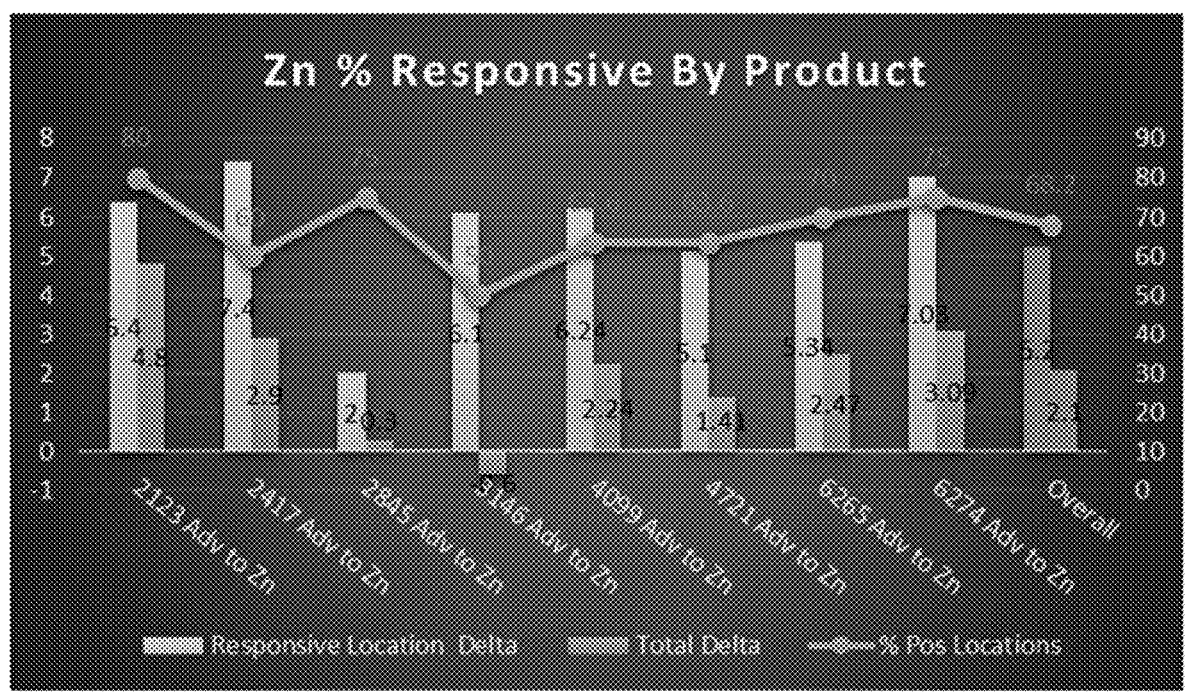
FIG. 16 shows average yield responsiveness in eight corn hybrids at forty sites, to seed coats containing zinc fertilizer as compared to base seed coat containing no fertilizer.

FIG. 16 shows the yield response to seed coat application of zinc fertilizer (combined data from "Sample A Coating" and "Advanced Coating Zinc") as compared to "Base Coating." For each line, the average yield difference in bushels of sites that showed a positive response to zinc (yellow bar); the average yield difference in bushels of all sites (green bar); and the percentage of locations that showed a positive response to zinc (orange point) is given. Additionally, the overall average yield difference in bushels across sites that showed a positive response to zinc (red bar); the overall average yield difference in bushels across all sites (blue bar); and the overall percentage of locations that showed a positive response to zinc (orange point) is given. As shown in FIG. 16, these overall average values were 5.2 bushels, 2.1 bushels, and 68.2%, respectively.

Figure 17:
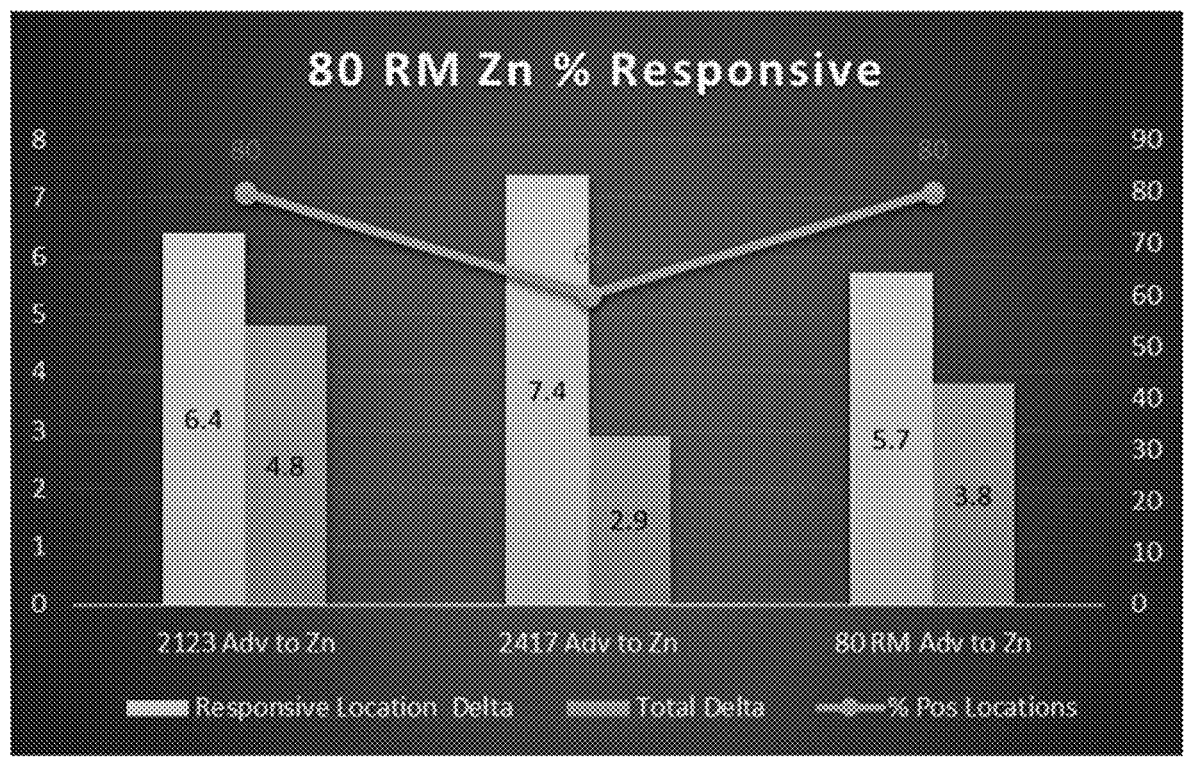
FIG. 17 shows average yield responsiveness in two 80-day relative maturity (RM) corn hybrids at five sites, to seed coats containing zinc fertilizer as compared to base seed coat containing no fertilizer.

FIG. 17 shows data as presented in FIG. 16 for the two 80 RM lines 2123 (left) and 2417 (middle), and the average of these two 80 RM lines (right). The 80 RM line average yield difference in bushels across sites that showed a positive response to zinc was 5.7 bushels. The 80 RM average yield difference in bushels across all sites was 3.8 bushels. The percentage of locations wherein 80 RM lines showed a positive response to zinc was 80%.

Figure 18:
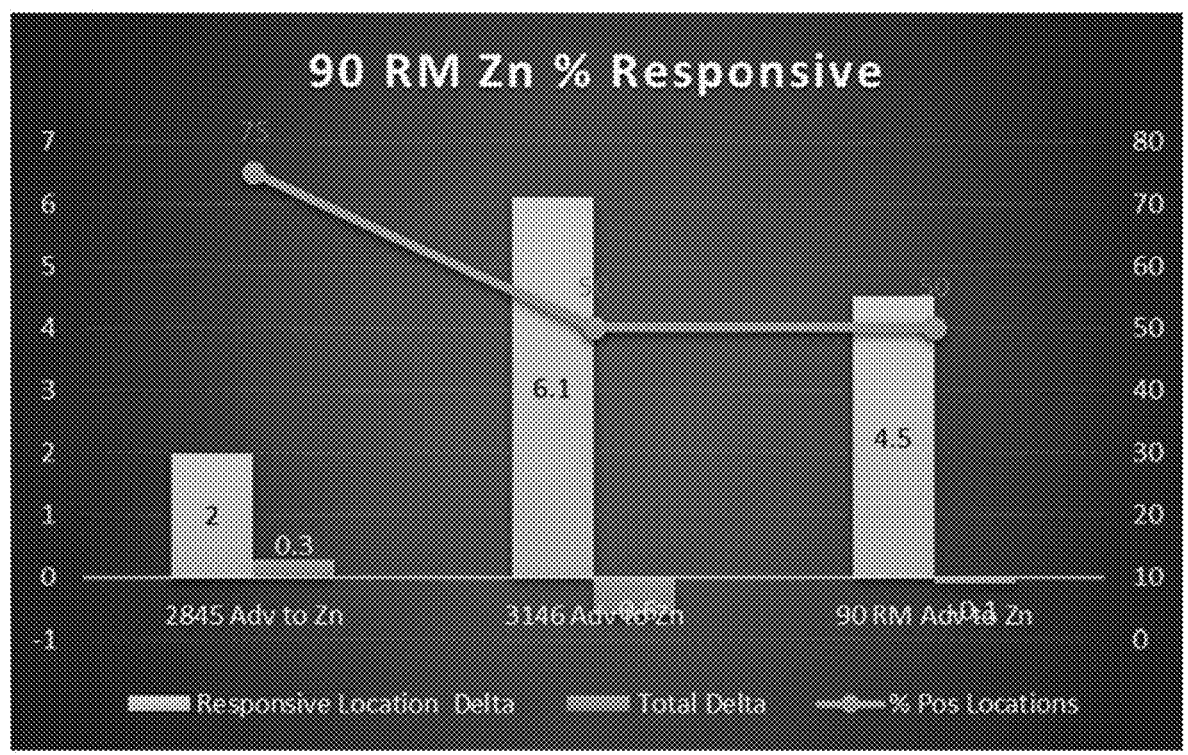
FIG. 18 shows average yield responsiveness in two 90-day relative maturity (RM) corn hybrids at four sites, to seed coats containing zinc fertilizer as compared to base seed coat containing no fertilizer.

FIG. 18 shows data as presented in FIG. 16 for the two 90 RM lines 2845 (left) and 3146 (middle), and the average of these two 90 RM lines (right). The 90 RM line average yield difference in bushels across sites that showed a positive response to zinc was 4.5 bushels. The 90 RM average yield difference in bushels across all sites was −0.1 bushels. The percentage of locations wherein 90 RM lines showed a positive response to zinc was 50%.

Figure 19:
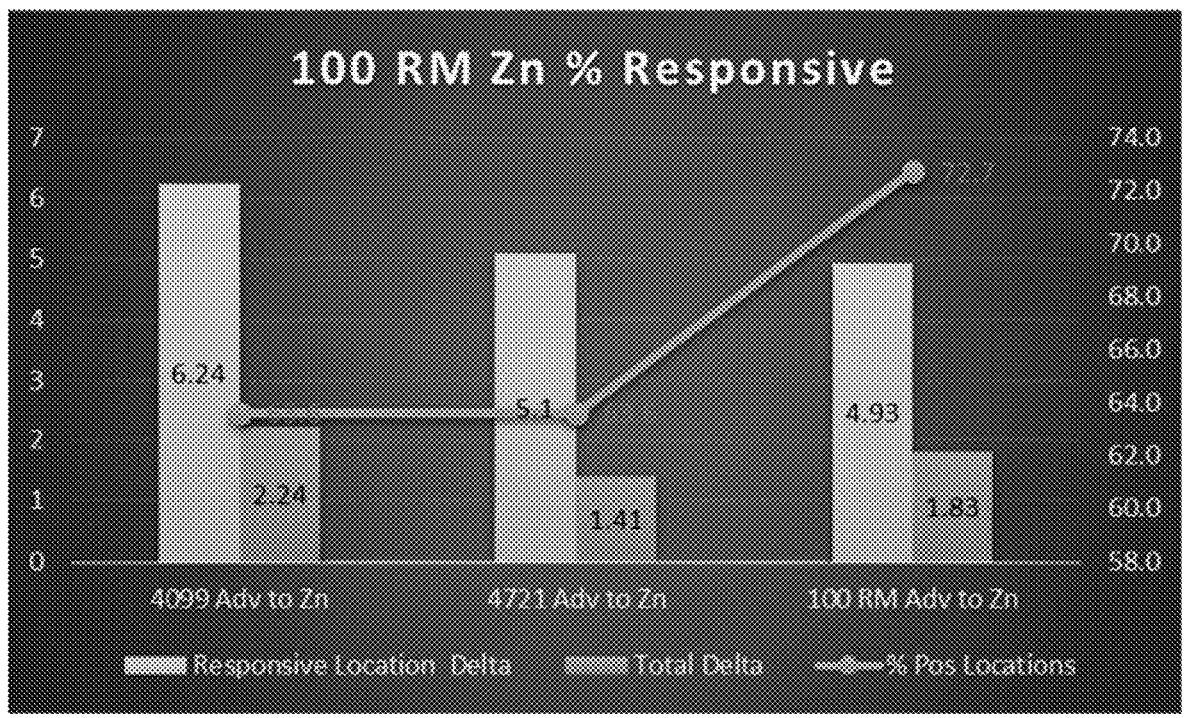
FIG. 19 shows average yield responsiveness in two 100-day relative maturity (RM) corn hybrids at eleven sites, to seed coats containing zinc fertilizer as compared to base seed coat containing no fertilizer.

FIG. 19 shows data as presented in FIG. 16 for the two 100 RM lines 4099 (left) and 4721 (middle), and the average of these two 100 RM lines (right). The 100 RM line average yield difference in bushels across sites that showed a positive response to zinc was 4.93 bushels. The 100 RM average yield difference in bushels across all sites was 1.83 bushels. The percentage of locations wherein 100 RM lines showed a positive response to zinc was 72.7%.

Figure 20:
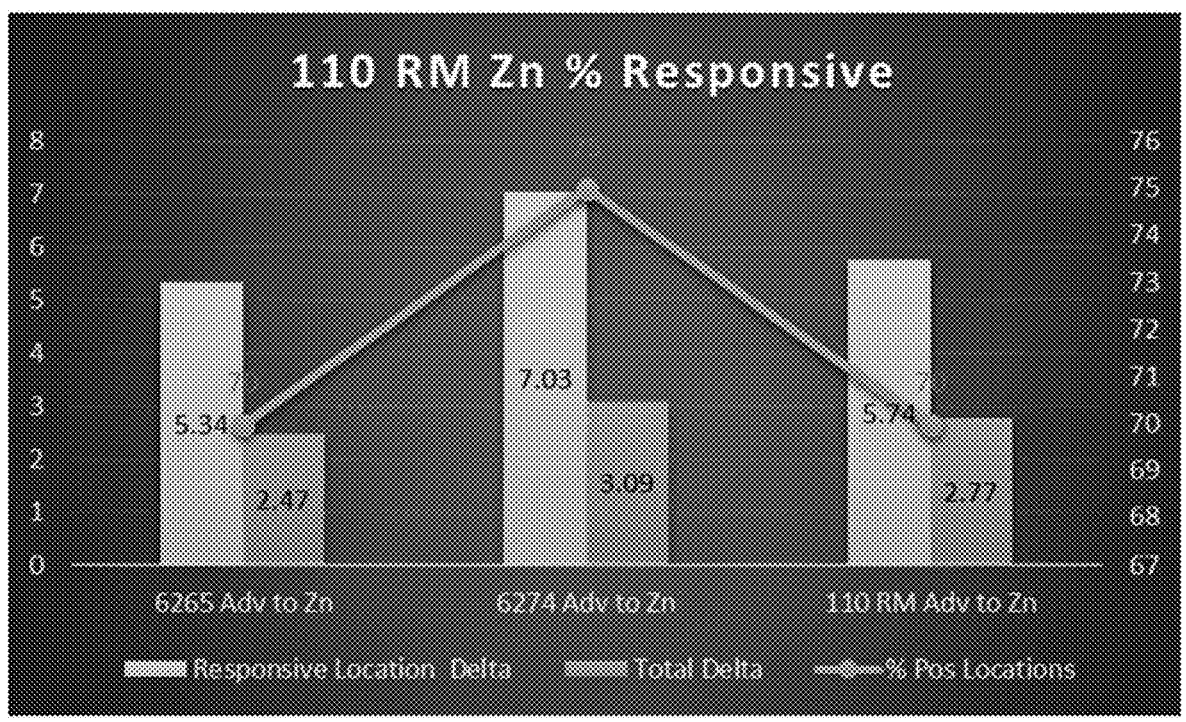
FIG. 20 shows average yield responsiveness in two 110-day relative maturity (RM) corn hybrids at twenty sites, to seed coats containing zinc fertilizer as compared to base seed coat containing no fertilizer.

FIG. 20 shows data as presented in FIG. 16 for the two 110 RM lines 6265 (left) and 6274 (middle), and the average of these two 110 RM lines (right). The 110 RM line average yield difference in bushels across sites that showed a positive response to zinc was 5.74 bushels. The 110 RM average yield difference in bushels across all sites was 2.77 bushels. The percentage of locations wherein 110 RM lines showed a positive response to zinc was 70%.

Figure 21:
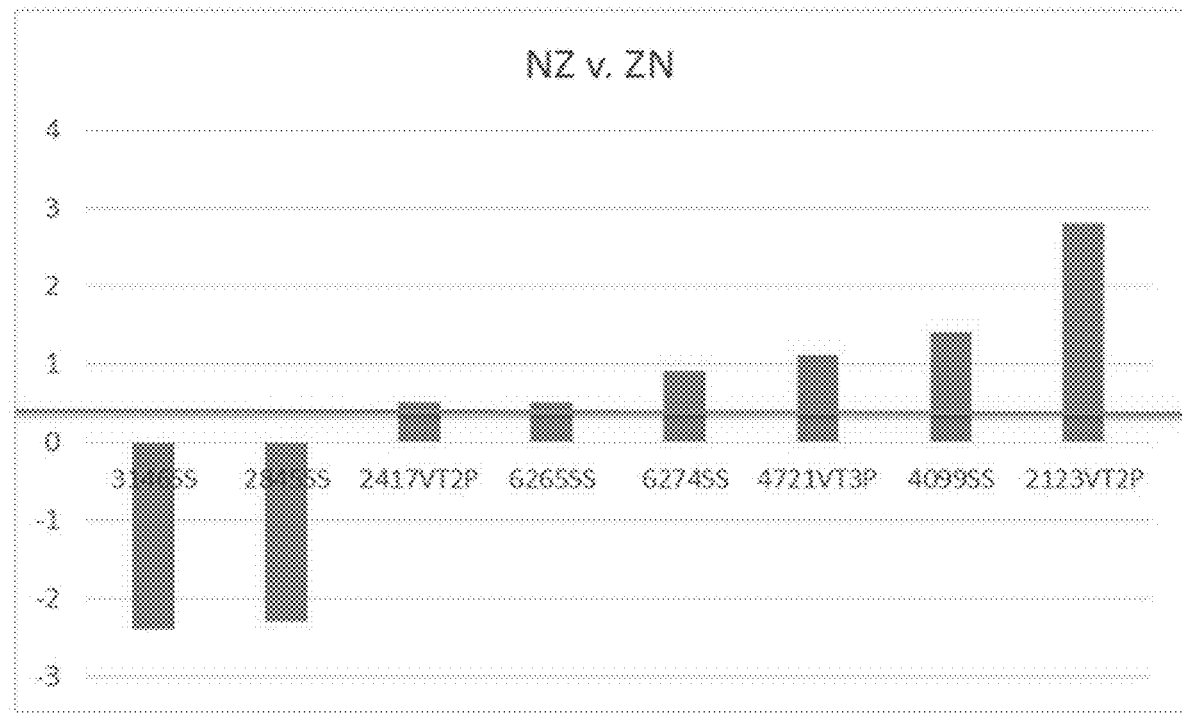
FIG. 21 shows the difference in yield responsiveness in eight corn hybrids at forty sites, between seed coated with an existing commercial zinc fertilizer containing seed coat; and seed coated with a seed coat containing zinc fertilizer nanoparticles of the invention.

FIG. 21 shows the difference in yield between "Sample A Coating" (labelled NZ) and "Advanced Coating Zinc" (labelled ZN). For each of the eight lines 3146 (labelled 3146 SS), 2845 (labelled 2845 SS), 2417 (labelled 2417VT2P), 6265 (labelled 6265 SS), 6274 (labelled 6274 SS), 4721 (labelled 4721VT3P), 4099 (labelled 4099 SS), and 2123 (labelled 2123VT2P), the average difference in yield in bushels at all sites is given by blue bars. The overall average of all lines is given as a green line.

As shown in FIG. 21, of the 8 lines, 6 demonstrated an increase in yield in response to "Sample A Coating" as compared to "Advanced Coating Zinc." Additionally, the overall average yield was 0.3 bushels higher using "Sample A Coating" as compared to "Advanced Coating Zinc." Only the two 90 RM lines 3146 and 2845 showed lower average yield in response to "Sample A Coating" as compared to "Advanced Coating Zinc." When these 90 RM lines were excluded, the overall average yield was 1.2 bushels higher using Sample A Coating as compared to Advanced Coating Zinc.

Overall, these data demonstrate that application of nanoparticles as described herein as a seed coat can have surprising advantages for increasing crop yield.

Example 5—Industrial-Scale Production of Zinc Hydroxide Nitrate Nanoparticle Fertilizer Introduction This example demonstrates scaled-up production of zinc hydroxide nitrate (ZHN) nanoparticles, production of a stable suspension of these particles, and assessment of the particles and suspension.

ZHN Nanoparticle Production

The process used to produce ZHN nanoparticles was as follows:

1) 8 kg of technical grade $Zn(NO_3)_2 \cdot 6H_2O$ (obtained from Chem-Supply, Australia) was added to a 30 L reaction bucket. To this 10 L of hot/boiling tap water was added, stirred and allowed to reduce in temperature to 60° C. The bucket was then placed in a large tub of water at −60° C. to maintain temperature during reaction
2) 3 kg of technical grade KOH (obtained from Chem-Supply, Australia) was divided in to four containers. Before addition to the reaction bucket each container was filled with ambient tap water (2.5 L each) and allowed to cool to 60° C.
3) The KOH solution was then added to the reaction bucket through a funnel with a small opening at the bottom to allow a steady but slow addition of the KOH solution. During addition the suspension in the reaction bucket was hand stirred with a large plastic spatula.
4) After addition of all the KOH solution the reaction bucket was removed from the water bath and allowed to settle and cool.

In summary, a zinc nitrate solution at 60° C. was hand stirred and a potassium hydroxide solution also at 60° C. was slowly added. This was repeated a number of times to produce a significant quantity of ZHN particles. The mother liquid was reduced and zinc was consumed according to the reaction:

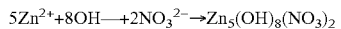

$$5Zn^{2+}+8OH^-+2NO_3^- \rightarrow Zn_5(OH)_8(NO_3)_2$$

It is known that a ZnO impurity can occur when enough KOH is added to theoretically consume all zinc. However, such an impurity was considered acceptable to allow consumption of all of the, relatively expensive, zinc, and to produce relatively pure potassium nitrate mother liquor, which could be used for other purposes.

The mother liquor of each batch (26 L) contained 77.9 g/L of K and 0.2 g/L of Zn. This is a significant concentration of electrolyte that is expected to influence the activity of stabilization agents. Therefore, the solid product was allowed to settle, the mother liquor decanted and collected. The particles were also washed to remove further electrolytes.

Figure 6:
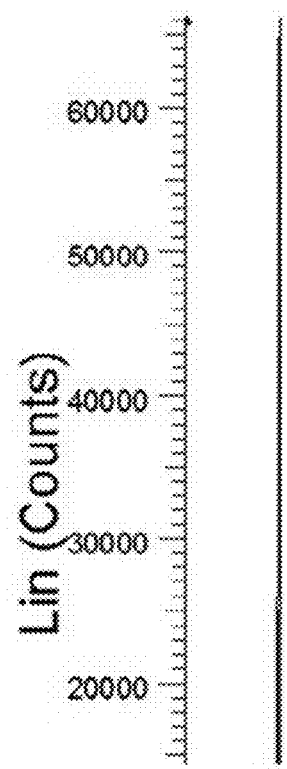
FIG. 6 shows x-ray powder diffraction (XRD) patterns of zinc hydroxide nitrate nanoparticles produced using an industrial scale procedure, and washed and milled.

For each batch approximately 3 kg of product was made. The conversion of zinc into solid particles was almost complete, as shown by a very low concentration of zinc in the mother liquor. The particles were predominantly ZHN but contained some ZnO impurity as shown by x-ray diffraction (XRD) (FIG. 6).

Figure 7:
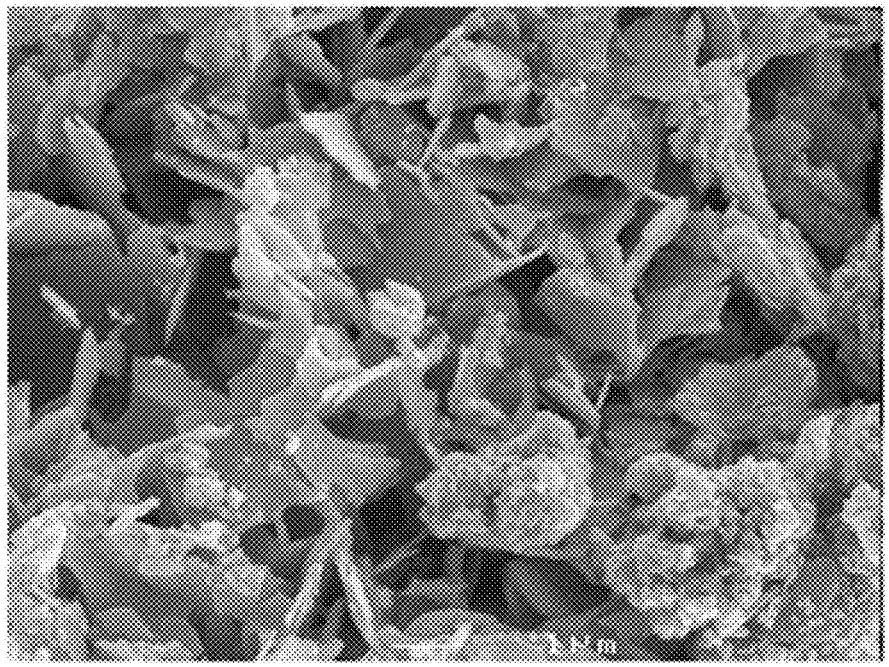
FIG. 7 shows SEM images of zinc hydroxide nitrate nanoparticles produced using an industrial scale procedure (Panel (A)) after washing but before milling; and (Panel (B)) after washing and milling.
Figure 7:
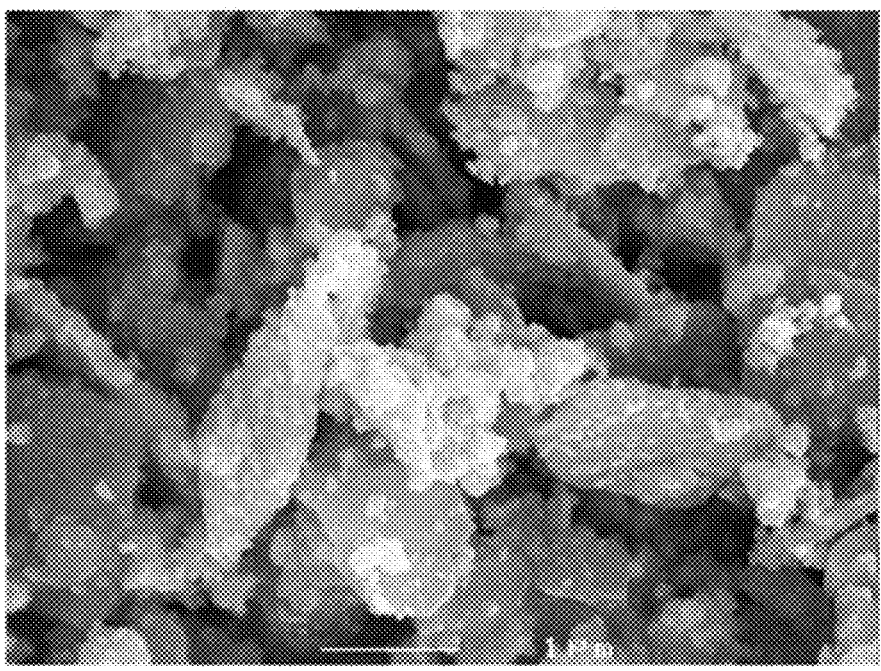
Figure 8:
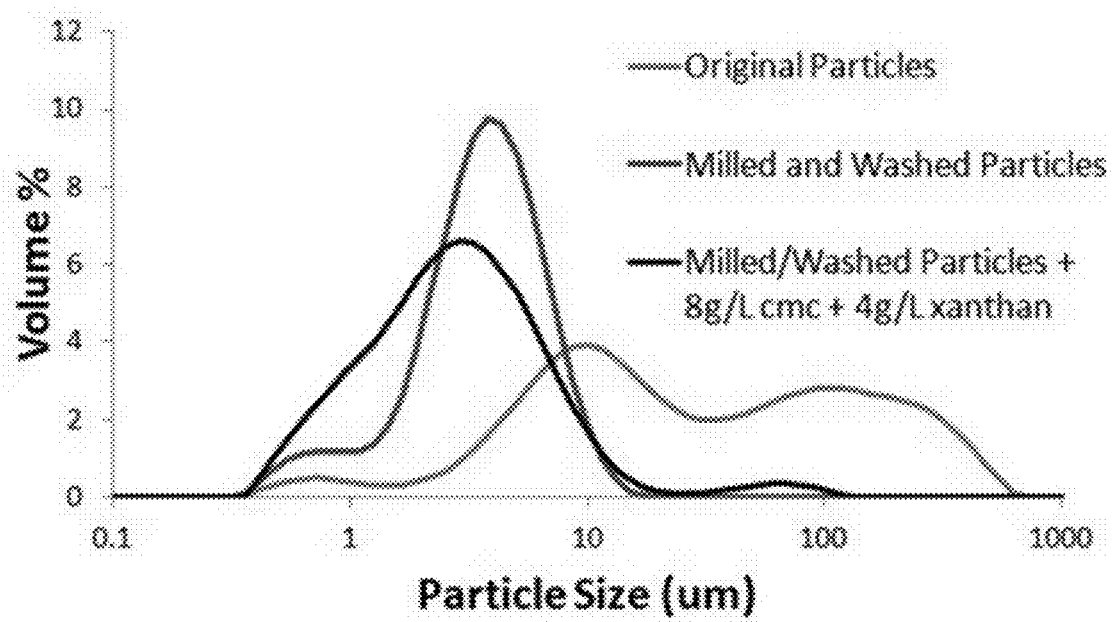
FIG. 8 shows particle size distribution of zinc hydroxide nitrate nanoparticles produced using an industrial scale procedure before washing and milling (blue line); after washing and milling (red line); and after washing and milling and the addition of stabilization additives (black line).
Figure 9:
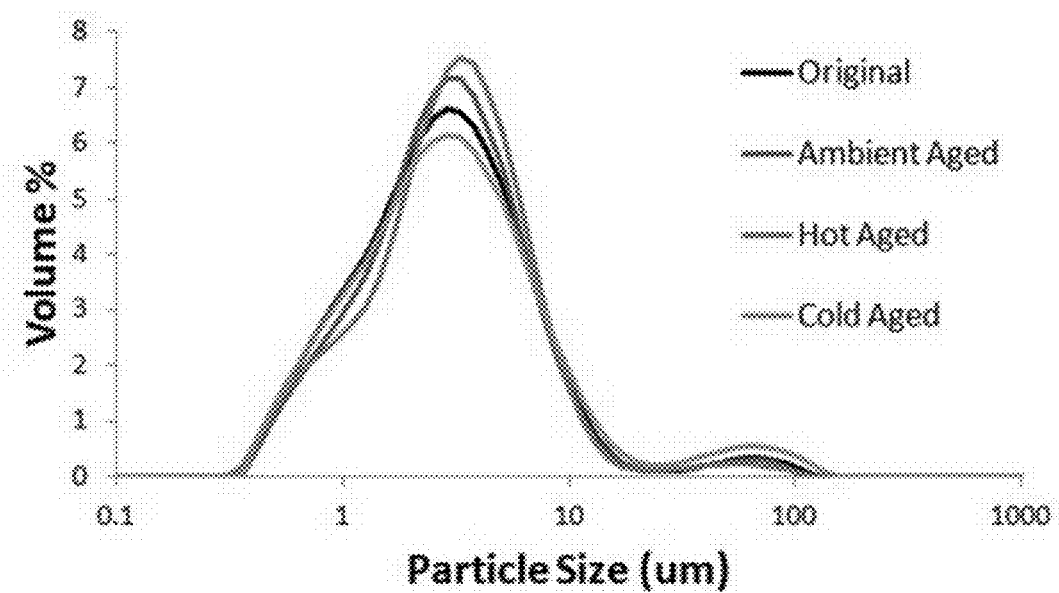
FIG. 9 shows particle size distribution of zinc hydroxide nitrate nanoparticles produced using an industrial scale procedure, milled, washed and with stabilization additives added, directly after processing (black line); and wherein the particles have been aged for 17 days at 22° C. (purple line); 42° C. (blue line); and 4° C. (yellow line).

The ZHN particles were sheet-like (micrometer size in length and breadth, and nanometer thickness) while the ZnO impurities were particles of nanosize, as shown by scanning electron microscopy (SEM) (FIG. 7, Panel (A)). The resulting particle size distribution was relatively large, with a d(0.9) of 220 μm (FIG. 8). Therefore, the particles were milled to a d(0.9) of 6.8 μm (FIG. 9). The particles were then washed with RO water, allowed to settle and the wash water decanted. This was repeated a number of times to remove as much electrolyte as possible. The resulting SEM of the milled and washed particles is shown in FIG. 7, Panel (B). The characteristics of the final raw nanoparticles are shown in Table 2, below. These nanoparticles are referred to herein as Sample D.

ZHN Suspension Preparation

Testing of an additive to produce a stable suspension of the Zn particles started with xanthan gum, however no ideal concentration could be found. Similar studies with carboxymethyl cellulose (CMC) were also conducted with similar results. A combination of both CMC and xanthan gum was found to produce better results.

A viable method of stabilizing the particles was found by adding 8 g/L of carboxymethyl cellulose (CMC), which was dispersed in propylene glycol (PG) at 1 part cmc to 10 parts PG by weight. This was added while the slurry was mixed with a hand blender. Then 4 g/L of xanthan gum (dispersed in PG at 1 part xanthan to 10 parts PG by weight) was added while blending. The resulting particle size distribution was similar, with a d(0.9) of 7.3 μm (FIG. 8).

A centrifuge test was undertaken using 40 g of sample, at 2000 rpm for 3 minutes. There was a very thin layer of clear liquid at the top, which could not be decanted without also decanting particles. When the sample was poured it flowed but was a bit "gluggy" and no hard solids were accumulated at the bottom of the centrifuge tube.

Samples where then exposed to temperature of 4° C., 22° C. or 42° C. for 17 days. Samples were then allowed to reach room temperature and a centrifuge test undertaken. The particle size distribution was similar regardless of aging (FIG. 9). Over the 17 days the cold treated sample did not settle at all while the ambient and hot treated sample had a very thin layer of clear liquid at the top. The "pourability" of the cold treated sample was good and similar to the ambient treated. The "pourability" of hot treated sample was not ideal as it turned into a gelled mass that needed a bit of agitation (i.e., tapped the container) to flow and was "gluggy." However, the flow properties of the hot treated sample returned to normal with a little hand shaking.

Both temperature treated samples passed the centrifuge test. The cold treated sample only had a thin layer clear liquid at the top, which could not be decanted without also decanting particles. When the sample was poured it flowed with a few chunks and no hard solids were accumulated at the bottom of the centrifuge tube. The hot treated sample did have a clear liquid at the top, which accounted for 6% of the total mass, that is within the passing range. The hot treated sample poured as a complete gelled mass (which could be dispersed with hand shaking) with no hard solids at the bottom.

Example 6—Industrial-Scale Production of Iron Oxalate Nanoparticle Fertilizer

This example demonstrates scaled-up production of iron oxalate (FeOx) nanoparticles.

FeOx Nanoparticle Production

The process used to produce the FeOx nanoparticles was as follows:

1) 1.4 kg of technical grade $K_2C_2O_4 \cdot H_2O$ (from ChemSupply, Australia) was added to a 10 L baffled reaction bucket. To this 3.6 L of tap water was added, agitated with an overhead stirrer and allowed to increase in temperature to 20° C.

2) 2 kg of technical grade $FeSO_4 \cdot 7H_2O$ (from ChemSupply, Australia) was mixed in a bucket with 4.5 L of tap water and allowed to increase in temperature to 20° C.

3) The FeSO4 solution was then added to the reaction bucket through a funnel with a small opening at the bottom to allow a steady but slow addition of the $FeSO_4$ solution. During addition the suspension in the reaction bucket was stirred with an overhead stirrer at 1200 rpm.

4) After addition of all the FeSO4 solution the reaction bucket was removed from the water bath and allowed to settle.

In summary, a potassium oxalate solution at 20° C. was stirred in a 10 L baffled bucked and an iron(II) sulphate solution also at 20° C. was slowly added. This was repeated a number of times to produce a significant quantity of FeOx particles. The amount of mother liquid was reduced and iron was consumed according to the reaction $Fe^{2+} + C_2O_4^{2-} \rightarrow FeC_2O_4$. The conversion of Fe to FeOx was ~84% (based on the Fe concentration in the mother liquor).

The mother liquor of each batch (9 L) contained 66.0 g/L of K and 7.4 g/L of Fe. This concentration of electrolyte is significant and is expected to influence the ability of stabilization agents. Therefore, the solid product was allowed to settle, the mother liquor decanted and collected. The particles washed before and after milling to remove further electrolytes.

Figure 10:
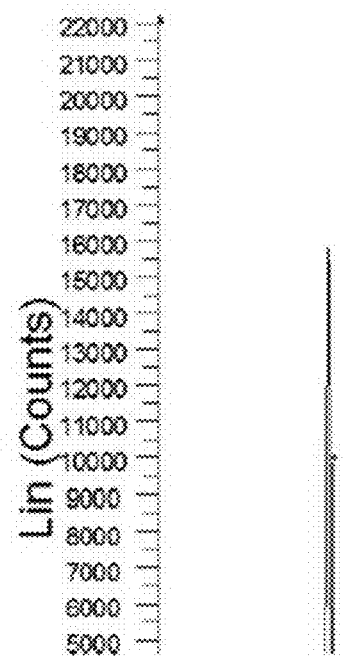
FIG. 10 shows XRD patterns of iron(II) oxalate nanoparticles produced using an industrial scale procedure (Panel (A)) after washing but before milling; and (Panel (B)) after washing and milling.
Figure 10:
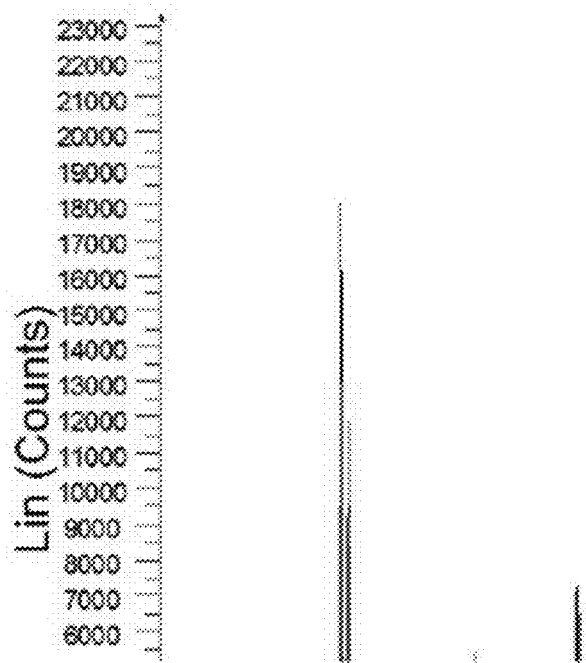

The conversion of Fe to FeOx particles was ~84% (based on the Fe concentration in the mother liquor). The particles are $FeC_2O_4$ as shown by XRD, with unknown peaks due to a minor impurity, as shown in FIG. 10.

Figure 11:
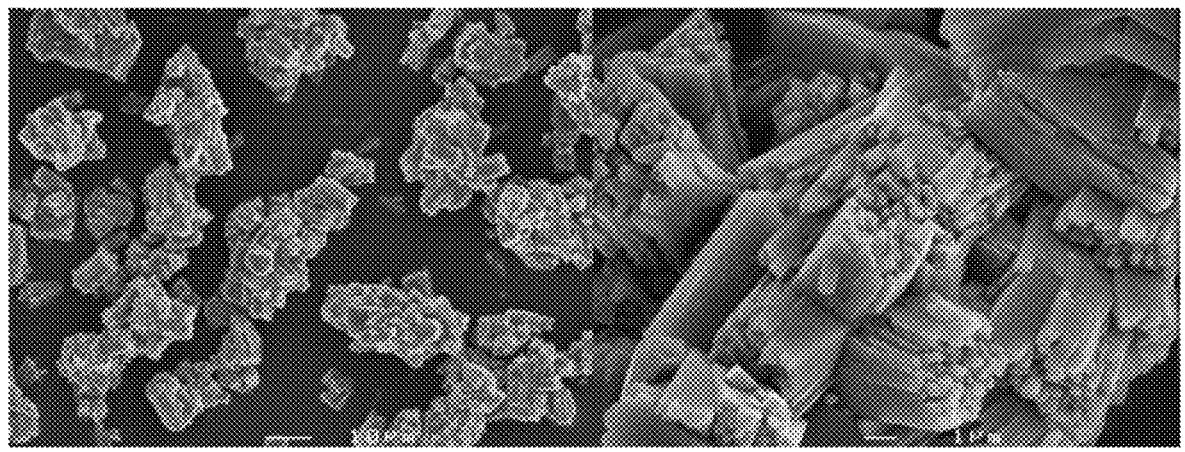
FIG. 11 shows SEM images of iron(II) oxalate nanoparticles produced using an industrial scale procedure (Panel (A)) after washing but before milling; and (Panel (B)) after washing and milling.
Figure 11:
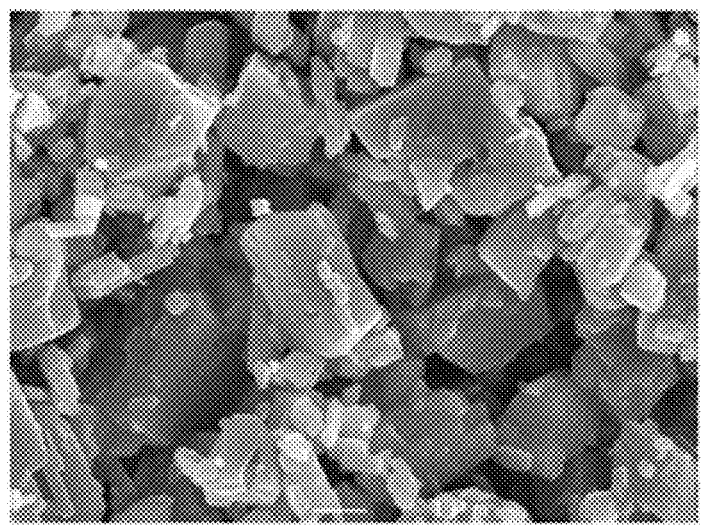
Figure 12:
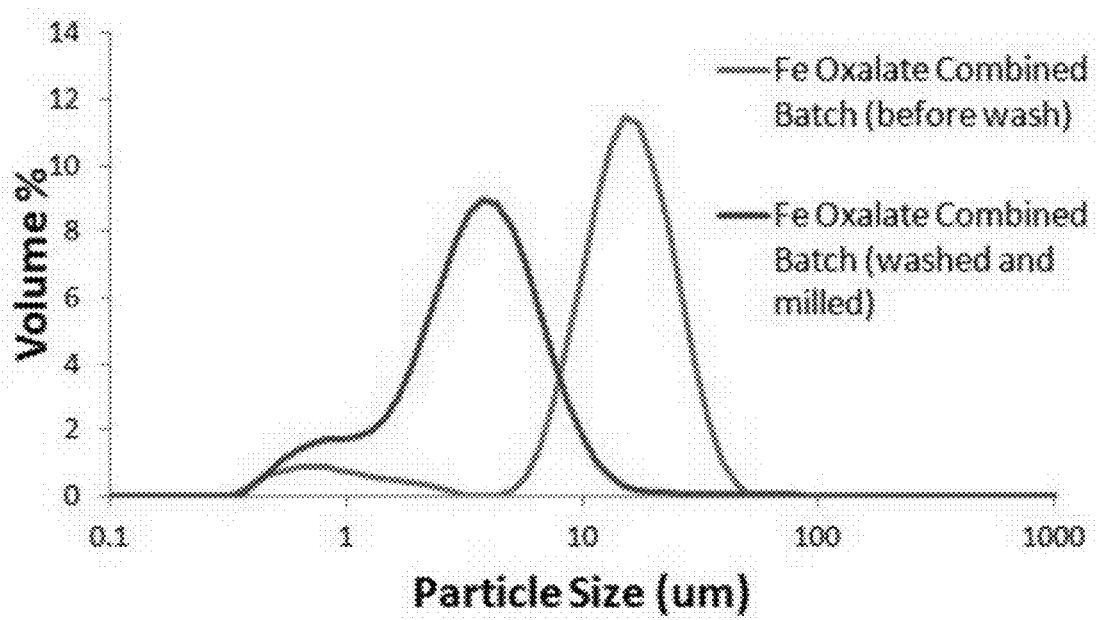
FIG. 12 shows particle size distribution of iron(II) oxalate nanoparticles produced using an industrial scale procedure before milling and washing (blue line); and after milling and washing (red line).

The morphology of the FeOx particles prior to milling is shown by SEM in FIG. 11, Panel (A). The resulting particle size distribution was relatively large, with a d(0.9) of 24.7 μm (FIG. 12). Therefore, the particles were milled to a d(0.9) of 6.95 μm (FIG. 12). The resulting SEM of the milled particles is shown in FIG. 11, Panel (B).

The particles were then washed with RO water, allowed to settle and the wash water decanted. This was repeated a number of times to remove as much electrolyte as possible. XRD was performed on the final product and it was found that the product had changed phase to the Humboldtine form of $FeC_2O_4$, which is believed to be due to the temperature of 35° C. in the mill. The characteristics of the final raw product are shown in Table 3, below. These nanoparticles are referred to herein as Sample E.

Example 7—Industrial-Scale Production of Iron Oxalate Nanoparticle Fertilizer This example demonstrates scaled-up production of iron manganese oxalate (MnOx) nanoparticles.

MnOx Nanoparticle Production

The process used to produce the MnOx nanoparticles was as follows:

1) 2.2 kg of technical grade $K_2C_2O_4.H_2O$ (from Chem-Supply, Australia) was added to a 10 L baffled reaction bucket. To this 3.5 L of hot/boiling tap water was added, agitated with an overhead stirrer and allowed to reduce in temperature to 60° C.
2) 2 kg of technical grade $MnSO_4.H_2O$ (from Chem-Supply, Australia) was mixed in a bucket with 5 L of boiling tap water and allowed to cool to 70° C.
3) The $MnSO_4$ solution was then added to the reaction bucket through a funnel with a small opening at the bottom to allow a steady but slow addition of the $MnSO_4$ solution. During addition the suspension in the reaction bucket was stirred with an overhead stirrer at 1200 rpm.
4) After addition of all the $MnSO_4$ solution the reaction bucket was removed from the water bath and allowed to settle and cool.

In summary, a potassium oxalate solution at 60° C. was stirred in a 10 L baffled bucket and a manganese(II) sulphate solution at 70° C. was slowly added. This was repeated a number of times to produce a significant quantity of MnOx particles. The amount of mother liquid was reduced and manganese was consumed according to the reaction $Mn^{2+} + C_2O_4^{2-} \rightarrow MnC_2O_4$.

The mother liquor of each batch (9 L) was saturated with potassium sulphate and contained 0.8 g/L of Mn. The concentration of electrolyte is significant and is expected influence the activity of stabilization agents. Therefore, the solid product and the crystallized potassium sulphate were allowed to settle, the mother liquor decanted and collected. The particles were washed before and after milling to remove further electrolytes (see below).

The conversion of Mn to MnOx particles was ~100% (based on the Mn concentration in the mother liquor). As the mother liquor became supersaturated with potassium sulphate as it cools, the MnOx product at the bottom of the bucket was covered by a thin layer of potassium sulphate crystals, which were removed by washing with RO water.

The MnOx particles were pure manganese(II) oxalate (Lindbergite, $Mn^{2+}(C_2O_4).2H_2O$) as shown by XRD (FIG. 13). The MnOx were cubic-like and aggregated as shown in by SEM in FIG. 14, Panel (A). The resulting particle size distribution was large, with a d(0.9) of 753 µm (FIG. 15). Therefore, the particles were milled to a d(0.9) of 115.7 µm (See FIG. 15). The resulting SEM of the milled particles is shown in FIG. 14, Panel (B).

The particles were then washed with more RO water, allowed to settle and the wash water decanted. This was repeated a number of times to remove as much electrolyte as possible. The characteristics of the final raw product are shown in Table 4, below. These nanoparticles are referred to herein as Sample F.

Throughout the specification the arm has been to describe preferred embodiments of the invention without limiting the invention to any one embodiment or specific collection of features. It will be appreciated by those of skill in the art that, in light of the present disclosure, various modifications and changes can be made in the particular embodiments exemplified without departing from the scope of the invention.

TABLES

TABLE 1

Foliar zinc uptake from various samples

| Fertilizers | Applied Zn (µg) | Zn uptake (µg/leaf) | % applied dose |
|---|---|---|---|
| Sample A | 288 | 26.85 | 9.32 |
| Sample B | 300 | 16.49 | 5.50 |
| Sample C | 300 | 15.67 | 5.22 |
| Activist 30% Zn | 268 | 9.84 | 3.67 |
| $LSD_{0.05}$ | | 6.95 | 2.38 |

TABLE 2

Characteristics of Sample D nanoparticles.

| Characteristic | Value |
|---|---|
| Solid Content | 41.2 w/w % |
| Total Zn Content | 320 g/L |
| Density | 1.51 g/mL |
| Total Volume Produced (after losses) | 23 L |
| d(0.9) | 6.792 µm |
| pH | 6.8 |

TABLE 3

Characteristics of Sample E nanoparticles.

| Characteristic | Value |
|---|---|
| Solid Content | 43.4 w/w % |
| Density (g/mL) | 1.33 |
| d(0.9) | 6.95 µm |
| pH | 7.3 |

TABLE 4

Characteristics of Sample F nanoparticles.

| Characteristic | Value |
|---|---|
| Solid Content | 46.5 w/w % |
| Density (g/mL) | 1.37 |
| d(0.9) | 115.7 µm |
| pH | 6.4 |

What is claimed is:

1. A composition comprising nanoparticles having a ratio of contact surface area to total surface area of greater than 1:4, a platelet morphology, and an overall positive surface charge in water at neutral pH, wherein the nanoparticles consist essentially of:
   a cationic element selected from the group consisting of zinc, copper, iron, manganese, boron, molybdenum, potassium, and magnesium; and
   one or more groups capable of forming a water soluble salt with the cationic element.

2. The composition of claim 1, wherein the ratio of the contact surface area to the total surface area of the nanoparticles is greater than 1:3.

3. The composition of claim 1, wherein a ratio of the contact surface area of the nanoparticles to a volume of the nanoparticles is at least 10.

4. The composition of claim 1, wherein the nanoparticles are nanocrystals.

5. The composition of claim 1, wherein the nanoparticles are water soluble nanoparticles.

6. The composition of claim 5, wherein the composition is a fertilizer composition, and wherein the water soluble nanoparticles are water soluble fertilizing nanoparticles.

7. The composition of claim 6, wherein the cationic element is a cationic nutrient element.

8. The composition of claim 1, wherein the ratio of the contact surface area to the total surface area ratio of the nanoparticles is between 1:3 to 1:2.

9. The composition of claim 1, wherein the nanoparticles have a thickness less than about 250 nm.

10. The composition of claim 1, wherein the nanoparticles have a thickness less than about 100 nm.

11. The composition of claim 1, wherein the ratio of the contact surface area to the total surface area of the nanoparticles is within a range of from 1:4 to 1:2.

12. The composition of claim 1, wherein a ratio of the contact surface area of the nanoparticles to a volume of the nanoparticles is at least 100.

13. The composition of claim 1, wherein the nanoparticles have a thickness of about 50 nm to about 100 nm and a lateral dimension of about 0.2 µm to about 1 µm.

14. The composition of claim 1, wherein the one or more groups capable of forming a water-soluble salt with a cationic element are selected from the group consisting of nitrate, chloride, sulphate, phosphate and acetate.

15. The composition of claim 14, wherein the cationic element is zinc, and wherein the one or more groups comprise at least one nitrate group.

16. The composition of claim 15, wherein the nanoparticles comprise a zinc hydroxide nitrate.

17. The composition of claim 16, wherein the nanoparticles comprise $Zn_5(OH)_8(NO_3)_2.2H_2O$.

18. The composition of claim 17, further comprising an aqueous liquid carrier.

19. The composition of claim 18, wherein the solubility of the nanoparticles in the aqueous liquid carrier is between 0.1-100 mg/L for micronutrient elements and 100-1000 mg/L for macronutrient elements.

20. The composition of claim 18, wherein the nanoparticles are dispersed in the aqueous liquid carrier.

* * * * *

UNITED STATES PATENT AND TRADEMARK OFFICE
CERTIFICATE OF CORRECTION

PATENT NO.        : 11,021,408 B2
APPLICATION NO.   : 16/162152
DATED             : June 1, 2021
INVENTOR(S)       : Longbin Huang et al.

It is certified that error appears in the above-identified patent and that said Letters Patent is hereby corrected as shown below:

In the Specification
Column 8,    Line 12,    change "0.2-1" to --0.2-1 µm.--
Column 19,   Line 61,    change "the arm has" to --the aim has--

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*